United States Patent
Uemura et al.

(10) Patent No.: US 8,447,312 B2
(45) Date of Patent: May 21, 2013

(54) METHOD FOR CONNECTING MOBILE STATION TO BASE STATION, MOBILE STATION, BASE STATION, MULTI-CARRIER MOBILE COMMUNICATION SYSTEM, AND RANDOM ACCESS CHANNEL MAPPING METHOD

(75) Inventors: Katsunari Uemura, Chiba (JP); Wahoh Oh, Chiba (JP); Yasuyuki Kato, Chiba (JP); Shohei Yamada, Chiba (JP)

(73) Assignee: Sharp Kabushiki Kaisha, Osaka (JP)

( * ) Notice: Subject to any disclaimer, the term of this patent is extended or adjusted under 35 U.S.C. 154(b) by 52 days.

(21) Appl. No.: 13/175,696

(22) Filed: Jul. 1, 2011

(65) Prior Publication Data

US 2011/0263266 A1  Oct. 27, 2011

Related U.S. Application Data

(63) Continuation of application No. 12/302,854, filed as application No. PCT/JP2007/061102 on May 31, 2007, now Pat. No. 8,000,294.

(30) Foreign Application Priority Data

Jun. 1, 2006  (JP) ................. 2006-153956

(51) Int. Cl.
*H04W 72/00* (2009.01)
*H04W 4/00* (2009.01)

(52) U.S. Cl.
USPC .......................... 455/450; 370/329

(58) Field of Classification Search
USPC .......................... 455/450; 370/329
See application file for complete search history.

(56) References Cited

U.S. PATENT DOCUMENTS 5,204,976 A  4/1993  Baldwin et al.
7,117,003 B2  10/2006  Kayama et al.
(Continued)

FOREIGN PATENT DOCUMENTS

EP  0455388 A2  11/1991
EP  1 715 709 A1  10/2006
(Continued)

OTHER PUBLICATIONS

3GPP TR 25.814 V1.4.0 (May 2006), "3rd Generation Partnership Project; Technical Specification Group Radio Access Network; Physical Layer Aspects for Evolved UTRA (Release 7)", pp. 1-133, May 22, 2006.

(Continued)

*Primary Examiner* — Kamran Afshar
*Assistant Examiner* — Omoniyi Obayanju
(74) *Attorney, Agent, or Firm* — Birch, Stewart, Kolasch & Birch, LLP

(57) ABSTRACT

In a mobile station, correction information is obtained from a base station for correcting a transmission timing shift in an uplink line of the mobile station, and the transmission timing shift is corrected in accordance with the correction information. Within a period in which the correction information is valid, the mobile station requests communication resource allocation information from the base station, using a random access channel having guard time. In an alternate embodiment, if a communication resource for transmitting a control channel in the uplink line is assigned to the mobile station within a period during which the correction information is valid, the mobile station instead requests the communication resource allocation information from the base station using the control channel in an uplink line from the mobile station to the base station.

10 Claims, 18 Drawing Sheets

U.S. PATENT DOCUMENTS

| | | | |
|---|---|---|---|
| 7,187,903 | B1 | 3/2007 | Febvre et al. |
| 7,203,493 | B2 | 4/2007 | Fujii et al. |
| 7,532,891 | B2 | 5/2009 | Febvre et al. |
| 2003/0096631 | A1 | 5/2003 | Kayama et al. |
| 2004/0156328 | A1 | 8/2004 | Walton et al. |
| 2006/0189334 | A1 | 8/2006 | Wakabayashi |
| 2007/0254656 | A1* | 11/2007 | Dalsgaard .................. 455/435.1 |
| 2008/0025252 | A1 | 1/2008 | Umesh et al. |
| 2010/0034155 | A1 | 2/2010 | Noh et al. |
| 2010/0080181 | A1 | 4/2010 | Yamada et al. |

FOREIGN PATENT DOCUMENTS

| | | |
|---|---|---|
| EP | 1 784 036 A1 | 5/2007 |
| EP | 1 788 828 A1 | 5/2007 |
| JP | 4-90221 A | 3/1992 |
| JP | 4-140933 A | 5/1992 |
| JP | 2000-269876 A | 9/2000 |
| JP | 2002-198893 A | 7/2002 |
| JP | 2003-163962 A | 6/2003 |
| JP | 2006-054617 A | 2/2006 |
| JP | 2006-504338 A | 2/2006 |
| WO | 2005/034545 A1 | 4/2005 |
| WO | 2005/086520 A1 | 9/2005 |
| WO | 2006/016457 A1 | 2/2006 |
| WO | 2006/027834 A1 | 3/2006 |
| WO | 2006/030913 A1 | 3/2006 |

OTHER PUBLICATIONS

3GPP TR 25.814 V1.4.1 (May 2006) "Technical Report, Physical Layer Aspects for Evolved UTRA." http://www.3gpp.org/ftp.Specs/html-info/25814.htm; (Release 7) pp. 20-22.

3GPP TR 25.814 V1.5.0; 3rd Generation Partnership Project; Technical Specification Group Radio Access Network; Physical Layer Aspects for Evolved UTRA (Release 7), May 27, 2006.

Ericsson, Joint RAN1/RAN2 meeting on LTE, Tdoc "R2-060866", Athens, Greece, pp. 27-31 (Mar. 2006).

Ericsson, TSG-RAN WG1#43, E-UTRA Random Access, "R1-051445" (Nov. 11, 2005).

LG Electronics: "Uplink resource request for uplink scheduling", Mar. 21, 2006, 3GPP Draft; R1-060922 UL Request_with TP, 3rd Generation Partnership Project (3GPP), Mobile Competence Centre, XP050101828.

LG Electronics: "LTE Random Access Use Cases", 3GPP Draft; R2-060890, 3rd Generation Partnership Project (3GPP), Mobile Competence Centre, vol. RAN WG2, No. 20060323, Mar. 23, 2006, XP050130834.

Motorola: "Random Access Payload Size", 3GPP Draft; R1-061166_RA_Payloadsize, 3rd Generation Partnership Project (3GPP), Mobile Competence Centre, vol. RAN WG1, No. 20060502, May 2, 2006, XP050102053.

Philips: "Initial Access Procedures for LTE Rach", 3GPP Draft; R2-061256, 3rd Generation Partnership Project (3GPP), Mobile Competence Centre, vol. RAN WG2, No. 20060504, May 4, 2006, XP050131202.

Tachikawa (2001) "W-CDMA Mobile Communication Method", Maruzen Co., Ltd. pp. 44-47.

Texas Instruments, 3GPP TSG RAN WG2 Meeting #52, "R2-061071" Athens, Greece, pp. 27-31 (Mar. 2006).

U.S. Notice of Allowance dated Apr. 11, 2011 in U.S. Appl. No. 12/302,854.

* cited by examiner

METHOD FOR CONNECTING MOBILE STATION TO BASE STATION, MOBILE STATION, BASE STATION, MULTI-CARRIER MOBILE COMMUNICATION SYSTEM, AND RANDOM ACCESS CHANNEL MAPPING METHOD

This application is a continuation of application Ser. No. 12/302,854 filed on Nov. 28, 2008 now U.S. Pat. No. 8,000,294 and for which priority is claimed under 35 U.S.C. §120, Application No. JP2006-153956 is the national phase of PCT International Application No. PCT/JP2007/061102 filed on May 31, 2007 under 35 U.S.C. §371. The entire contents of each of the above-identified applications are hereby incorporated by reference.

TECHNICAL FIELD

The present invention relates to a connection processing method between a mobile station and a base station, a mobile station, a base station, a multi-carrier mobile communication system, and a mapping method of a random access channel.

TECHNICAL BACKGROUND

Currently as a radio access technology (RAT) which is a radio access technology, wideband-code division multiple access (W-CDMA, non-patent document. 1) regulated by $3^{rd}$ Generation Partnership Project (3GPP) has been standardized as the third-generation cellular mobile communication method and service utilizing it has been started.

Moreover, evolved universal terrestrial radio access (evolution of third-generation RAT, hereinafter referred to as EUTRA) and evolved universal terrestrial radio access network (evolution of third-generation access network, hereinafter referred to as EUTRAN) have been discussed. For EUTRA, orthogonal frequency division multiplexing access (OFDMA) has been proposed as a communication method (non-patent document 2).

The EUTRA, which is a standard of the next-generation communication, uses the third-generation (3G) technology as its basis and employs OFDM or the like to enhance larger capacity and higher speed in mobile communication. Although it is assumed that the 3G technology is basically adhered, on the other hand, there are many problems that must be but cannot be solved by the 3G technology.

An uplink random access channel (RACH) sequence in an uplink in EUTRA is an important procedure for a mobile station and a base station in carrying out connection processing there between (e.g., importance thereof is pointed in non-patent document 3). However, procedure or meaning thereof differs greatly in the 3G technology and EUTRA standard.

That is, according to the 3G technology, a random access channel (RACH: a channel which enables a mobile station to transmit to a base station at an arbitrary timing and is used for establishing an uplink) is not orthogonal to a data channel and therefore there may be a case where interference occurs between the RACH and the data channel. Therefore, what is called power ramping is required so that transmission power is gradually increased on the mobile station side until the base station can receive data (e.g., refer to pp 45-47 "2-2-3 Random access" in the above-mentioned non-patent document 1).

Here, random access in uplink by the W-CDMA method will be briefly explained using FIG. 22. FIG. 22 is a flowchart showing procedures of random access in uplink by the W-CDMA method.

A mobile station which carries out initial transmission, that is, a mobile station right after power thereof is turned on or a mobile station intermittently receiving data, is required to transmit a random access channel (RACH) to a base station first to establish an uplink between the base station. Because the RACH is used before respective uplink resource is allocated, there is a case where transmission frequency and timing of the RACH are the same as those of another mobile station. At this time, due to degraded transmission signal caused by interference between stations, the base station cannot correctly receive the RACH.

Therefore, as shown in FIG. 22, the mobile station randomly selects a data signal row specifying a transmission mobile station called RACH Preamble first and transmits it to the base station (Step S20). If Acknowledge (ACK) indicating a transmission permit is returned from the base station for the RACH Preamble (Step S21), actual data transmission called RACH message is started (Step S22). On the other hand, in a case where ACK is not returned from the base station (Step S21), or Not Acknowledge (NACK) is returned, transmission power of the RACH Preamble is increased (Step S25) and transmission of the RACH Preamble is carried out again. While confirming whether predetermined number of retransmission has been finished (Step S23), same processing is repeated. If ACK from the base station cannot be received even after the predetermined number of transmission has been finished, it is judged that RACH transmission failed (Step S24) and the procedures are finished.

On the other hand, in a mobile communication method using OFDM (method of EUTRA), because RACH is orthogonal to a data channel, there does not basically occur an interference between the both sides and therefore power ramping as described above is not required.

Instead, however, in the OFDM communication, transmission timing correction on the mobile station taking influence of multi-path into consideration (processing for establishment of temporal synchronization on the basis of transmission timing correction information from the base station) and allocation processing of a communication resource by scheduling on the base station are required. These processings are processings unique to a case of utilizing the OFDM and 3G technology cannot be incorporated. Therefore, a new connection processing technology between a mobile station and a base station is requested.

Non-patent document 1: Tachikawa, K, 2001. "W-CDMA Mobile Communication Method": Maruzen Co., Ltd.
Non-patent document 2: 3GPP TR (Technical Report) 25.814, V1. 4. 1 (2006-5), Physical Layer Aspects for Evolved UTRA. http://www.3gpp.org/ftp/Specs/html-info/25814.htm
Non-patent document 3: Ericsson. "E-UTRA Random Access", 3GPP TSG RAN WG1 Meeting #43, Seoul, Korea, 7-11 Nov. 2005

DISCLOSURE OF THE INVENTION

Problem to be Solved by the Invention

In the connection processing in an uplink line for enabling data transmission between a mobile station and a base station in the EUTRA, there is no regulation set on what type of a channel is to be used. Especially, condition of a mobile station in a relationship between a base station may always be changed and therefore without clarifying which communication channel is used in which case, connection processing cannot be carried out.

Moreover, a transmission procedure from a mobile station to a base station or from a base station to a mobile station is not set uniformly. For example, there is a case where each of two types of information (e.g., uplink synchronization request and resource allocation request transmitted by a mobile station to a base station) may be transmitted by respective sequence or both of the two types of information may be transmitted simultaneously (in parallel). Therefore, to be able to flexibly correspond to such variation of transmission, discussion on content of connection processing is important.

In addition, in the connection processing in the uplink line according to the EUTRA standard, it is important to increase utilization efficiency of OFDM communication resources and to avoid wasting a resource which can be used for data communication or the like carried out in a simultaneous and parallel manner. Especially, how synchronous RACH/asynchronous RACH is mapped to a communication resource is an important issue.

The present invention has been made in consideration of the above and is aimed at achieving a new connection processing between a mobile station and a base station which can flexibly correspond to actual condition of the mobile station or to variation of an actual transmission procedure, can efficiently utilize a communication resource, and follows the EUTRA standard.

Means for Solving Problem (1) A connection processing method of the present invention is a connection processing method between a mobile station and a base station including a random access channel having guard time used in a condition where temporal synchronization of an uplink line between the mobile station and the base station is not established, and a synchronous random access channel used in a condition where an uplink line between the mobile station and the base station is established and the random access channel having the guard time, the synchronous random access channel, and a control channel in the uplink line are provided as a channel selected for the mobile station to transmit information requesting temporal synchronization in the uplink line or information requesting allocation of a communication resource to the base station, wherein based on whether there is temporal synchronization or allocation of a communication resource in the uplink line at the point of time when transmission data is generated in the mobile station, one is selected from the three channels to carry out connection processing between the mobile station and the base station.

According to the connection processing method of the present invention, two types of random access channels, a random access channel having guard time used in a condition where temporal synchronization in an uplink line between the mobile station and the base station is not established (asynchronous RACH) and a synchronous random access channel used in a condition where temporal synchronization in an uplink line between the mobile station and the base station is established (synchronous RACH), are provided. Because the RACH is originally a channel for a mobile station to transmit at an arbitrary timing to a base station, it is generally assumed that temporal synchronization between the base station is not established at this point of time. In case of verbal communication, only such a case can be assumed. However, in case of data packet communication, there is a case where RACH is transmitted from the mobile station to the base station in a condition where temporal synchronization between the base station is established. For example, a case where an uplink between the base station is established, that is, data is transmitted in a condition where transmission timing difference is corrected, and subsequently, before the link disappears, that is, while correction of transmission timing difference is valid, data transmission of a new uplink is required and the mobile station transmits a RACH to the base station. In such a case, for example, if the RACH is transmitted at the timing that matches top of a frame of a synchronized link, a sub-frame, or an OFDM symbol, timing matches receiving timing in the base station. Therefore, the RACH in this case can be called a synchronous RACH. The asynchronous RACH needs to set guard time, for example, a redundant period which is extension of a unique code multiplied to the RACH, to reduce influence of multi-path when mapping the data to a sub-carrier and transmitting to the base station. However, the synchronous RACH does not need the guard time. Therefore, effective usage of the synchronous RACH enables efficient usage of a communication resource. Moreover, according to the connection processing method of the present invention, other than the synchronous RACH and the asynchronous RACH, a control channel which can be used commonly among a plurality of mobile stations (e.g., an uplink shared control channel (USCCH) corresponds thereto) is assumed as a channel having a possibility to be used in uplink. This channel is a transmission timing difference corrected (uplink synchronized) channel for transmission using a resource allocated by the base station and the mobile station can use the channel for transmission of a channel quality indicator (CQI), hybrid auto repeat request (HARQ), ACK/NACK, or the like to the base station. Then, for example, it is assumed that there may occur a case where a new resource allocation request is transmitted using the resource currently allocated and the uplink shared control channel (USCCH) if new transmission data is generated after a resource is allocated from the base station. Therefore, the uplink shared control channel (USCCH) is also a channel having a possibility to be used for uplink connection processing. Resultingly, channels having a possibility to be used for uplink connection processing include the asynchronous RACH and the synchronous RACH, as channels used before allocation of a resource and an uplink shared control channel (USCCH) as a channel used after allocation of a resource, and there are three channels in total. Here, a specific name of the "commonly usable control channel" is not especially specified. However, in the following explanation, for easy of explanation, the channel will be described as the uplink shared control channel (USCCH) (but not limited thereto). Then, in the present invention, the synchronous RACH, the asynchronous RACH, and the USCCH are adaptively used taking, especially, usage efficiency of a resource, uplink resource allocation condition in the mobile station, and uplink time synchronization condition into consideration. That is, condition of the mobile station at the point of time when transmission data is generated in the mobile station is classified depending on whether there is temporal synchronization and whether there is allocation of a resource, and depending on the necessity, classified by the type of information requesting allocation of a resource which is transmitted from the mobile station to the base station (i.e., there may be a case where types of a signal used for request of schedule information is taken into consideration for classifying because a signal notifying existence of transmission data, a signal notifying volume of transmission data, a signal notifying types and rate of transmission data, a signal notifying transmission buffer volume, or many other signals can be used as a request signal for schedule information of a resource). Then, if transmission data is actually generated in the mobile station, depending on the condition of the mobile station thus classified, one channel is adaptively selected from the above three channels. Thus, it becomes possible to establish the most appropriate uplink line connection processing method which follows EUTRA standard and can flexibly respond taking usage efficiency of a resource or specific condition of the mobile station into consideration.

(2) Moreover, the connection processing method of the present invention carries out connection processing between the mobile station and the base station by classifying the uplink line synchronization condition and allocation condition of a communication resource at the time when transmission data is generated in the mobile station into four: a first condition where uplink line is not synchronized and no communication resource is allocated; a second condition where uplink line is synchronized and no communication resource is allocated; a third condition where uplink line is not synchronized and a communication resource is allocated; and a fourth condition where uplink line is synchronized and a communication resource is allocated, and depending on the condition thus classified, one is selected from the three channels.

If data to be transmitted is generated in the mobile station, connection processing sequence to be taken by the mobile station to the base station differs depending on whether uplink temporal synchronization is already established or not and whether resource information is already transmitted from the base station. Focusing on this point, the inventors classified the condition into four types depending on temporal synchronization/non-synchronization and on resource allocation (first to fourth conditions), and specific consideration is taken in each case to determine a most appropriate channel in each case. Specifically, for example, because there are three conditions, detached condition, idle condition, and active condition, of the mobile station in the EUTRA, it is taken into consideration which condition is classified into which classification and the most appropriate channel for use in each condition is determined. Here, the detached condition is a condition where the base station does not recognize the existence of the mobile station because of a reason such as the mobile station is just turned on, or the mobile station has just transited to a difference RAT. The idle condition means a condition where the base station recognizes the existence of the mobile station yet data communication therebetween is not carried out, the base station allocates downlink resource minimum for incoming to the mobile station, and the mobile station intermittently receives data by the resource thus allocated. The active condition means a condition where the base station recognizes existence of the mobile station and data communication is carried out between the base station and the mobile station.

(3) Further, according to the connection processing method of the present invention, the mobile station transmits information requesting temporal synchronization of the uplink line to the base station by use of a random access channel having guard time and transmits the information requesting allocation of communication resource by use of a control channel in the uplink line in a condition where a communication resource is allocated while the mobile station transmits the information by use of a synchronization random access channel in a condition where the communication resource is not allocated.

Thus, it becomes possible to clarify basic procedures (sequence) in uplink connection processing matching the EUTRA.

(4) Further, in the connection processing method according to the present invention, the mobile station uses a random access channel having guard time to request temporal synchronization information in the uplink line and communication resource allocation information and the base station notifies the mobile station of the temporal synchronization information in the uplink line and the communication resource allocation information in response to the request from the mobile station in the first condition; the mobile station uses a random access channel having guard time to notify the base station whether there is untransmitted data for the purpose of requesting communication resource allocation information for transmitting the untransmitted data to the base station and the base station notifies the communication resource allocation information to the mobile station in response to the request from the mobile station in the second condition; the mobile station uses a random access channel having guard time to request temporal synchronization information in the uplink line to the base station and the base station notifies the mobile station of the temporal synchronization information in the uplink line in response to the request from the mobile station in the third condition; and the mobile station uses a control channel in the uplink line to notify the base station whether there is untransmitted data for the purpose of requesting communication resource allocation information to the base station for transmission of the untransmitted data and the base station notifies communication resource allocation data to the mobile station in response to the request from the mobile station in the fourth condition.

According to this configuration, it becomes possible for the mobile station to include both an uplink synchronization request (request of transmission timing) and a resource allocation request (request of schedule information) in one RACH transmission. Moreover, because a control channel which can be commonly used by a plurality of mobile stations (USCCH) can be used to request resource information by notifying the base station whether there is transmission data, there is no need to use the synchronous RACH. In such a case, the present invention clarifies a most suitable channel to be used for uplink connection processing in each of the above-mentioned first to fourth conditions.

(5) Further, according to the connection processing method according to the present invention, the mobile station uses a random access channel having guard time to request temporal synchronization information in the uplink line and communication resource allocation information and the base station notifies the mobile station of the temporal synchronization information in the uplink line and the communication resource allocation information in response to the request from the mobile station in the first condition; the mobile station uses a random access channel having guard time to notify volume of transmission data to the base station for the purpose of requesting to the base station communication resource allocation information for transmitting the data and the base station notifies the communication resource allocation information corresponding to the volume of the transmission data to the mobile station in response to the request from the mobile station in the second condition; the mobile station uses a random access channel having guard time to request temporal synchronization information in the uplink line to the base station and the base station notifies the mobile station of the temporal synchronization information in the uplink line in response to the request from the mobile station in the third condition; and the mobile station uses a control channel in the uplink line to notify the base station of volume of transmission data for the purpose of requesting communication resource allocation information to the base station for transmission of the data and the base station notifies communication resource allocation data corresponding to the volume of transmission data to the mobile station in response to the request from the mobile station in the fourth condition.

According to this configuration, it becomes possible for the mobile station to include both an uplink synchronization request (request of transmission timing) and a resource allocation request (request of schedule information) in one RACH transmission. Moreover, because a control channel which can be commonly used by a plurality of mobile stations (USCCH) can be used to request resource information by notifying the base station whether there is transmission data, there is no need to use the synchronous RACH. In such a case, the present invention clarifies a most suitable channel to be used for uplink connection processing in each of the above-mentioned first to fourth conditions.

(6) Further, according to the connection processing method of the present invention, the mobile station uses a random access channel having guard time to request temporal synchronization information in the uplink line and the base station notifies the mobile station of the temporal synchronization information in the uplink line in response to the request from the mobile station in the first condition; and the mobile station uses a synchronous random access channel to notify volume of transmission data to the base station for the purpose of requesting to the base station communication resource allocation information for transmitting the data and the base station notifies the communication resource allocation information corresponding to the volume of the transmission data to the mobile station in response to the request from the mobile station in the second condition.

This configuration is effective under the condition where the mobile station cannot include both an uplink synchronization request (request of transmission timing information) and a resource allocation request (request of schedule information) in one RACH transmission, the control channel which can be commonly used by a plurality of mobile stations (USCCH) cannot be used to request allocation of resource, and the synchronous RACH can be used to request resource information by notifying volume of the transmission data to the base station. In such a case, the present invention clarifies a most suitable channel to be used for uplink connection processing in each of the above-mentioned first and second conditions.

(7) Further, according to the connection processing method of the present invention, the mobile station uses a random access channel having guard time to request temporal synchronization information in the uplink line to the base station and the base station notifies the mobile station of the temporal synchronization information in the uplink line in response to the request from the mobile station in the first condition; the mobile station uses a synchronous random access channel to notify volume of transmission data to the base station for the purpose of requesting to the base station communication resource allocation information for transmitting the data and the base station notifies the communication resource allocation information corresponding to the volume of the transmission data to the mobile station in response to the request from the mobile station in the second condition; the mobile station uses a random access channel having guard time to request temporal synchronization information in the uplink line to the base station and the base station notifies the mobile station of the temporal synchronization information in the uplink line in response to the request from the mobile station in the third condition; and the mobile station uses a control channel in the uplink line to notify the base station of volume of transmission data for the purpose of requesting communication resource allocation information to the base station for transmission of the data and the base station notifies communication resource allocation data corresponding to the volume of transmission data to the mobile station in response to the request from the mobile station in the fourth condition.

This configuration is effective under the condition where the mobile station cannot include both an uplink synchronization request (request of transmission timing information) and a resource allocation request (request of schedule information) in one RACH transmission, a control channel which can be commonly used by a plurality of mobile stations (USCCH) can be used to request resource information by notifying the base station of the volume of the transmission data, and the synchronous RACH can also be used to request resource information by notifying volume of the transmission data to the base station. In such a case, the present invention clarifies a most suitable channel to be used for uplink connection processing in each of the above-mentioned first to fourth conditions.

(8) Further, according to the connection processing method of the present invention, in case of transmitting data including a predetermined transmission interval and fixed transmission rate, the mobile station uses a random access channel having guard time to request temporal synchronization information in the uplink line to the base station and the base station notifies the mobile station of the temporal synchronization information in the uplink in response to the request from the mobile station in the first condition; the mobile station uses a synchronous random access channel to notify data type and transmission rate to the base station for the purpose of requesting to the base station communication resource allocation information guaranteeing the predetermined transmission interval and the transmission rate and the base station notifies the communication resource allocation information to the mobile station in response to the request from the mobile station in the second condition; the mobile station uses a random access channel having guard time to request temporal synchronization information in the uplink line to the base station and the base station notifies the mobile station of the temporal synchronization information in the uplink line in response to the request from the mobile station in the third condition; and the mobile station uses a control channel in the uplink line to notify the base station of the data type and the transmission rate for the purpose of requesting communication resource allocation information guaranteeing the predetermined transmission interval and the transmission rate to the base station and the base station notifies the communication resource allocation information to the mobile station in response to the request from the mobile station in the fourth condition.

This configuration is effective under the condition where the mobile station cannot include both an uplink synchronization request (request for transmission timing information) and a resource allocation request (request for schedule information) in one RACH transmission, a control channel which can be commonly used by a plurality of mobile stations (USCCH) can be used to request resource information by notifying the base station of the data type and transmission rate of the transmission data, and the synchronous RACH can also be used to request resource information by notifying the data type and transmission rate of the transmission data to the base station. In such a case, the present invention clarifies a most suitable channel to be used for uplink connection processing in each of the above-mentioned first to fourth conditions.

(9) Further, according to the connection processing method of the present invention, in case of transmitting data including a predetermined transmission interval and variable transmission rate, the mobile station uses a random access channel having guard time to request temporal synchronization information in the uplink line and the base station notifies the mobile station of the temporal synchronization information in the uplink line in response to the request from the mobile station in the first condition; the mobile station uses a synchronous random access channel to notify data type and current transmission rate to the base station for the purpose of requesting to the base station communication resource allocation information guaranteeing the predetermined transmission interval and the current transmission rate and the base station notifies the communication resource allocation information to the mobile station in response to the request from the mobile station in the second condition; the mobile station uses a random access channel having guard time to request temporal synchronization information in the uplink line to the base station and the base station notifies the mobile station of the temporal synchronization information in the uplink line in response to the request from the mobile station in the third condition; and the mobile station uses a control channel in the uplink line to notify the base station of the data type and the current transmission rate for the purpose of requesting communication resource allocation information guaranteeing the predetermined transmission interval and the current transmission rate to the base station and the base station notifies the communication resource allocation information to the mobile station in response to the request from the mobile station in the fourth condition.

This configuration is effective under the condition where the mobile station cannot include both an uplink synchronization request (request for transmission timing information) and a resource allocation request (request for schedule information) in one RACH transmission, a control channel which can be commonly used by a plurality of mobile stations (US-CCH) can be used to request resource information by notifying the base station of the data type and transmission rate of the transmission data, the synchronous RACH can also be used to request resource information by notifying the data type and transmission rate of the transmission data to the base station, and the transmission data is transmitted with the predetermined transmission interval and variable transmission rate. In such a case, the present invention clarifies a most suitable channel to be used for uplink connection processing in each of the above-mentioned first to fourth conditions.

(10) Further, according to the connection processing method according to the present invention, the mobile station uses a random access channel having guard time to request temporal synchronization information in the uplink line and the base station notifies the mobile station of the temporal synchronization information in the uplink line in response to the request from the mobile station in the first condition; the mobile station uses a synchronous random access channel to notify data buffer volume accumulated in the mobile station to the base station for the purpose of requesting to the base station communication resource allocation information corresponding to the data buffer volume and the base station notifies the communication resource allocation information to the mobile station in response to the request from the mobile station in the second condition; the mobile station uses a random access channel having guard time to request temporal synchronization information in the uplink line to the base station and the base station notifies the mobile station of the temporal synchronization information in the uplink line in response to the request from the mobile station in the third condition; and the mobile station uses a control channel in the uplink line to notify the base station of data buffer volume accumulated in the mobile station for the purpose of requesting communication resource allocation information corresponding to the data buffer volume to the base station and the base station notifies communication resource allocation data to the mobile station in response to the request from the mobile station in the fourth condition.

This configuration is effective under the condition where the mobile station cannot include both an uplink synchronization request (request for transmission timing information) and a resource allocation request (request for schedule information) in one RACH transmission, a control channel which can be commonly used by a plurality of mobile stations (US-CCH) can be used to request resource information by notifying the base station of the untransmitted data buffer volume in the mobile station, and the synchronous RACH can also be used to request resource information by notifying the untransmitted data buffer volume in the mobile station to the base station. In such a case, the present invention clarifies a most suitable channel to be used for uplink connection processing in each of the above-mentioned first to fourth conditions.

(11) Further, according to the connection processing method of the present invention, the random access channel having guard time and the synchronous random access channel are time-shared along whole of the frequency band within respective predetermined time to be provided.

This shows a case where an asynchronous RACH and a synchronous RACH are mapped (allocated) to a resource regulated by a temporal axis and a frequency axis. That is, the synchronous RACH and the asynchronous RACH are mapped in different sub-frames with regard to the temporal axis, while the synchronous RACH and the asynchronous RACH are mapped in the whole of frequency band with regard to the frequency axis. In this case, it is possible to determine in which sub-frame period of one frame period the synchronous RACH/asynchronous RACH is allocated in a fixed manner. Therefore, an effect is obtained that the base station uses the fixed location to easily detect the received synchronous RACH/asynchronous RACH.

(12) Further, according to the connection processing method of the present invention, the random access channel having guard time and the synchronous random access channel are frequency divided in different frequency band to be provided in the same predetermined time.

Allocating the synchronous RACH/asynchronous RACH in different frequency bands in a common sub-frame period, that is, carrying out multiplexing in TTI by dividing frequency band, has an advantage that enables to transmit both synchronous RACH/asynchronous RACH by the same resource used in a case of providing either of the synchronous RACH/asynchronous RACH in the whole of frequency band within one sub-frame period and therefore a resource can be efficiently used. Moreover, depending on usage frequency of each RACH, the frequency band occupied by each of the RACHs can be changed adaptively so that a RACH with higher usage frequency can be reasonably (without causing a crush in the frequency band) provided. Therefore, it becomes possible to more efficiently use a resource.

(13) Further, according to the connection processing method of the present invention, the random access channel having guard time is provided in the whole of frequency band in a sub-frame period and at the same time the synchronous random access channel is temporal shared in a plurality of predetermined periods in a manner that the frequency band is periodically differed with frequency band of one resource unit as a unit so that frequency bands in each of the predetermined time do not overlap.

Because such a configuration where the synchronous RACH is provided equally in temporal axis direction is adopted, if a data transmission request is generated by the synchronous RACH, it becomes possible to immediately map the synchronous RACH to a resource (sub-carrier) without much waiting time. Therefore, an effect is obtained that processing delay until the synchronous RACH is transmitted can be prevented.

(14) Further, according to the connection processing method of the present invention, the random access channel having guard time and the synchronous random access channel are provided in the same frequency band within the same predetermined time.

Thus, a mapping method by which the synchronous RACH/asynchronous RACH use a common sub-frame period and a common frequency band is adopted. Because synchronous RACH/asynchronous RACH are provided by time-sharing system depending on the necessity within one sub-frame period, an effect that a resource is not vainly occupied is obtained.

(15) Further, according to the connection processing method according to the present invention, the base station transmits the temporal synchronization information in the uplink line or communication resource allocation information to the mobile station using the control channel in a downlink line.

Thus, the base station uses the control channel, which can be commonly used by a plurality of mobile stations (e.g., a downlink shared control channel: DSCCH), as a channel for transmitting transmission timing information (synchronization information) or schedule information (resource allocation information) to the mobile station. Thus, it becomes possible to carry out transmission of transmission timing information or schedule information without newly providing a control channel.

(16) Further, a mobile station according to the present invention includes a control signal analysis section for analyzing temporal synchronization information in the uplink line or communication resource allocation information included in a control signal from a base station, a schedule section for carrying out control to allocate transmission data to a communication resource in the uplink line on the basis of analysis result of the communication resource allocation information by the control signal analysis section, and a transmission timing adjustment section for carrying out control so that the transmission timing in the uplink line synchronizes with receiving timing of the base station on the basis of the analysis result of the temporal synchronization information in the uplink line by the control signal analysis section and carries out connection processing with the base station by selecting one from the synchronous random access channel, the random access channel having guard time, and the control channel in the uplink line based on whether or not there exists temporal synchronization and allocation of a communication resource in the uplink line at the time when transmission data is generated.

According to this configuration, a control signal analysis function to analyze the control signal transmitted from the base station and extract transmission timing information or schedule information, a schedule control function to adaptively use synchronous RACH/asynchronous RACH/control channel depending on the condition or the like of the mobile station to carry out mapping of a resource on the basis of schedule information from the base station and a transmission timing control function to carry out transmission timing correction on the basis of the transmission timing information from the base station can be utilized. Thus, it becomes possible to provide a mobile station apparatus following the EUTRA standard.

(17) Moreover, according to the mobile station of the present invention, selection from the synchronous random access channel, the random access channel having guard time, and the control channel in the uplink line is carried out by the schedule section or carried out on the basis of an instruction from the base station.

According to this configuration, control to adaptively use the synchronous RACH/asynchronous RACH/control channel depending on the condition or the like of the mobile station is carried out spontaneously by the mobile station or by an instruction from the base station (e.g., inserting instruction information in the schedule information).

(18) Further, the base station according to the present invention includes a channel detection section for detecting at least one of the synchronous random access channel, the random access channel having guard time, and the control channel in the uplink line, a timing information generation section for generating temporal synchronization information in the uplink line, a schedule information generation section for generating communication resource allocation information, and a transmission section for transmitting the temporal synchronization information in the uplink line or the communication resource allocation information as control signal of the control channel in the downlink line to the mobile station.

According to this configuration, a signal transmitted from a mobile station is received and the channel detection function to detect at least one from the synchronous random access channel (synchronous RACH), asynchronous random access channel (asynchronous RAM, and the control channel in the uplink line which can be commonly used by each mobile station (USCCH) included in a received signal, the function to generate transmission timing information (information for temporal synchronization) on the basis of influence by multi-path in the received signal, the function to allocate a resource to each mobile station (a generation function of resource information) and the function to transmit the transmission timing information and resource information in a condition where the information are included in the control channel can be utilized. Thus, it becomes possible to provide a base station matching the EUTRA standard.

(19) Further, the communication system according to the present invention includes any of the above-mentioned mobile station and the base station.

Thus, it becomes possible to construct a mobile communication system following the EUTRA standard where an uplink can be established by new connection processing between a mobile station and the base station.

(20) Moreover, a random access channel allocation method according to the present invention is a random access channel communication resource allocation method in an uplink line of a mobile communication method using orthogonal frequency division multiplexing wherein a random access channel having guard time and a synchronous random access channel are respectively provided within a common predetermined time.

This is an allocation method following with the EUTRA standard where the synchronous RACH/asynchronous RACH are mixed in a common predetermined time. It becomes possible to increase usage efficiency of a resource by efficiently using the synchronous RACH (having not guard time).

(21) Further, in the random access channel allocation method according to the present invention, the random access channel having guard time and the synchronous random access channel are time-shared along whole bandwidth to be respectively provided in different predetermined time.

The synchronous RACH and the asynchronous RACH are mapped in different sub-frames with regard to temporal axis and are mapped in whole frequency band with regard to frequency axis. In this case, because it is possible to determine previously in which sub-frame period of one frame period the synchronous RACH/asynchronous RACH is to be allocated, the base station can easily detect the received synchronous RACH/asynchronous RACH by use of the fixed location.

(22) Further, in the random access channel allocation method according to the present invention, the random access channel having guard time and the synchronous random access channel are frequency divided in different frequency band to be provided in the same predetermined time.

Allocating the synchronous RACH/asynchronous RACH in different frequency bands in a common sub-frame period (i.e., carrying out multiplexing by dividing frequency band,) has an advantage that enables to transmit both synchronous RACH/asynchronous RACH by the same resource used in a case where either of the synchronous RACH/asynchronous RACH is provided in the whole of frequency band in one sub-frame period and therefore a resource can be efficiently used. Moreover, depending on usage frequency of each RACH, the frequency band occupied by each of the RACHs can be changed adaptively so that a RACH with higher usage frequency can be reasonably (without causing a crush in the frequency band) provided. Therefore, it becomes possible to more efficiently use a resource.

(23) Further, in the random access channel allocation method according to the present invention, the random access channel having guard time is provided in the whole of frequency band in a sub-frame period and at the same time the synchronous random access channel is temporal shared in a plurality of predetermined periods in a manner that the frequency band is periodically differed with frequency band of one resource unit as a unit so that frequency bands in each of the predetermined time do not overlap.

By this configuration, because the synchronous RACH is provided equally in temporal axis direction, if a data transmission request is generated by the synchronous RACH, it becomes possible to immediately map the synchronous RACH to a resource (sub-carrier) without much waiting time. Therefore, an effect is obtained that processing delay until the synchronous RACH is transmitted can be prevented.

(24) Further, in the random access channel allocation method according to the present invention, the random access channel having guard time and the synchronous random access channel are provided in the same frequency band within the same predetermined time.

Thus, in the present invention, a mapping method where the synchronous RACH/asynchronous RACH shares a common sub-frame period and a common frequency band is adopted. In other words, within one sub-frame period, synchronous RACH and asynchronous RACH are time-shared to be provided depending on the necessity. Thus, an effect that a resource is not vainly occupied is obtained.

(25) Further, an uplink connection method according to the present invention is an uplink connection processing method from a mobile station to a base station, includes a first step where at least either of the mobile station or the base station determines if the condition of the mobile station is in a first condition where the uplink line is not synchronized and no communication resource is allocated, a second condition where the uplink line is synchronized and no communication resource is allocated, a third condition where the uplink line is not synchronized and a communication resource is allocated, or a fourth condition where the uplink line is synchronized and a communication resource is allocated, in case transmission data to the base station is generated in the mobile station; and a second step where one is selected from a random access channel having guard time, a synchronous random access channel, and a control channel in the uplink line on the basis of judgment result of the mobile station condition in the first step, and carries out uplink connection processing from the mobile station to the base station using the channel thus selected.

Thus, it becomes possible to realize uplink connection processing following the EUTRA standard.

(26) Further, the connection processing method according to the present invention is a connection processing method between a mobile station and a base station in which a random access channel having guard time and a control channel used in a condition where temporal synchronization of an uplink line is established are provided as a channel selected for transmission of information requesting temporal synchronization in the uplink line or requesting allocation of a communication resource and at the same time one is selected from the above channels on the basis of whether there is temporal synchronization in the uplink line and whether there is allocation of a communication resource at the point of time when transmission data is generated in the mobile station.

According to the connection processing method of the present invention, a random access channel having guard time used in a condition where temporal synchronization in an uplink line between the mobile station and the base station is not established (asynchronous RACH) is provided. Because the RACH is originally a channel for a mobile station to transmit at an arbitrary timing to a base station, it is generally assumed that temporal synchronization between the base station is not established at this point of time. In case of verbal communication, only such a case can be assumed. The asynchronous RACH needs to set guard time, for example, a redundant period which is extension of a unique code multiplied to the RACH, to reduce influence of multi-path when mapping the data to a sub-carrier and transmitting to the base station. Moreover, according to the connection processing method of the present invention, other than the asynchronous RACH, a control channel which can be used commonly among a plurality of mobile stations (e.g., an uplink shared control channel (USCCH) corresponds thereto) is assumed as a channel having a possibility to be used in uplink. This channel is a transmission timing difference corrected (uplink synchronized) channel for transmission using a resource allocated by the base station and the mobile station can use the channel for transmission of a channel quality indicator (CQI), hybrid auto repeat request (hybrid ARQ), ACK/NACK, or the like to the base station. Then, for example, it is assumed that there may occur a case where a new resource allocation request is transmitted using the resource currently allocated and the uplink shared control channel (USCCH) if new transmission data is generated after a resource is allocated from the base station. Therefore, the uplink shared control channel (USCCH) is also a channel having a possibility to be used for uplink connection processing. Then, in the present invention, the asynchronous RACH and the USCCH are adaptively used taking, especially, usage efficiency of a resource, uplink resource allocation condition in the mobile station, and uplink time synchronization condition into consideration. That is, condition of the mobile station at the time when transmission data is generated in the mobile station is classified depending on whether there is temporal synchronization and whether there is allocation of a resource, and depending on the necessity, classified by the type of information requesting allocation of a resource which is transmitted from the mobile station to the base station (i.e., there may be a case where types of a signal used for request of schedule information is taken into consideration for classifying because a signal notifying existence of transmission data, a signal notifying volume of transmission data, a signal notifying types and rate of transmission data, a signal notifying transmission buffer volume, or many other signals can be used as a request signal for schedule information of a resource). Then, if transmission data is actually generated in the mobile station, depending on the condition of the mobile station thus classified, one channel is adaptively selected from the above channels. Thus, it becomes possible to establish the most appropriate uplink line connection processing method which follows the EUTRA standard and can flexibly respond taking usage efficiency of a resource or specific condition of the mobile station into consideration.

(27) Further, the connection processing method of the present invention carries out connection processing between the mobile station and the base station by classifying the uplink line synchronization condition and allocation condition of a communication resource at the time when transmission data is generated in the mobile station into a first condition where uplink line is not synchronized and no communication resource is allocated, a second condition where uplink line is synchronized and no communication resource is allocated, a third condition where uplink line is not synchronized and a communication resource is allocated, and a fourth condition where uplink line is synchronized and a communication resource is allocated, and depending on the condition thus classified, one is selected from the above-mentioned channels.

If data to be transmitted is generated in the mobile station, connection processing sequence to be taken by the mobile station to the base station differs depending on whether uplink temporal synchronization is established or not, or whether resource information is already transmitted from the base station. Focusing on this point, the inventors classified the condition into four types depending on temporal synchronization/non-synchronization and on resource allocation (first to fourth conditions), and specific consideration is taken in each case to determine a most appropriate channel in each case. Specifically, for example, because there are three conditions, detached condition, idle condition, and active condition, of the mobile station in EUTRA, it is taken into consideration which condition is classified into which classification and the most appropriate channel for use in each condition is determined. Here, the detached condition is a condition where the base station does not recognize the existence of the mobile station because of a reason such as the mobile station is just turned on, or the mobile station has just transited to a difference RAT. The idle condition means a condition where the base station recognizes the existence of the mobile station yet data communication therebetween is not carried out, the base station allocates downlink resource minimum for incoming to the mobile station, and the mobile station intermittently receives data by the resource thus allocated. The active condition means a condition where the base station recognizes existence of the mobile station and data communication is carried out between the base station and the mobile station.

(28) Further, according to the connection processing method of the present invention, a mobile station transmits information requesting temporal synchronization of the uplink line to a base station using a random access channel having guard time and transmits the information requesting allocation of communication resource using control channel in the uplink line in a condition where a communication resource is allocated, and on the other hand, transmits the information using a random channel having guard time in a condition where the communication resource is not allocated.

Thus, it becomes possible to clarify basic procedures (sequence) in uplink connection processing matching the EUTRA.

(29) Further, in the connection processing method according to the present invention, the mobile station uses a random access channel having guard time to request temporal synchronization information in the uplink line and communication resource allocation information and the base station notifies the mobile station of the temporal synchronization information in the uplink line and the communication resource allocation information in response to the request from the mobile station in the first condition; the mobile station uses a random access channel having guard time to notify whether there is untransmitted data to the base station for the purpose of requesting communication resource allocation information for transmitting the untransmitted data to the base station and the base station notifies the communication resource allocation information to the mobile station in response to the request from the mobile station in the second condition; the mobile station uses a random access channel having guard time to request temporal synchronization information in the uplink line to the base station and the base station notifies the mobile station of the temporal synchronization information in the uplink line in response to the request from the mobile station in the third condition; and the mobile station uses a control channel in the uplink line to notify the base station whether there is untransmitted data for the purpose of requesting communication resource allocation information to the base station for transmission of the untransmitted data and the base station notifies communication resource allocation data to the mobile station in response to the request from the mobile station in the fourth condition.

According to this configuration, it becomes possible for the mobile station to include both an uplink synchronization request (request for transmission timing information) and a resource allocation request (request for schedule information) in one RACH transmission. Moreover, the control channel which can be commonly used by a plurality of mobile stations (USCCH) can be used to request resource information by notifying the base station whether there is transmission data. In such a case, the present invention clarifies a most suitable channel to be used for uplink connection processing in each of the above-mentioned first to fourth conditions.

(30) Further, according to the connection processing method according to the present invention, the mobile station uses a random access channel having guard time to request temporal synchronization information in the uplink line and communication resource allocation information to the base station and the base station notifies the mobile station of the temporal synchronization information in the uplink line and the communication resource allocation information in response to the request from the mobile station in the first condition; the mobile station uses a random access channel having guard time to notify volume of transmission data to the base station for the purpose of requesting to the base station communication resource allocation information for transmitting the data and the base station notifies the communication resource allocation information corresponding to the volume of the transmission data to the mobile station in response to the request from the mobile station in the second condition; the mobile station uses a random access channel having guard time to request temporal synchronization information in the uplink line to the base station and the base station notifies the mobile station of the temporal synchronization information in the uplink line in response to the request from the mobile station in the third condition; and the mobile station uses a control channel in the uplink line to notify the base station of volume of transmission data for the purpose of requesting communication resource allocation information to the base station for transmission of the data and the base station notifies communication resource allocation data corresponding to the volume of transmission data to the mobile station in response to the request from the mobile station in the fourth condition.

According to this configuration, it becomes possible for the mobile station to include both an uplink synchronization request (request for transmission timing information) and a resource allocation request (request for schedule information) in one RACH transmission. Moreover, a control channel which can be commonly used by a plurality of mobile stations (USCCH) can be used to request resource information by notifying the base station whether there is transmission data. In such a case, the present invention clarifies a most suitable channel to be used for uplink connection processing in each of the above-mentioned first to fourth conditions.

(31) Further, a connection processing method according to the present invention includes a mobile station applied to the connection processing method according to any of claims 26 to 30, wherein the mobile station has a control signal analysis section for extracting and analyzing temporal synchronization information in the uplink line or communication resource allocation information included in a control signal from a base station, a schedule section for carrying out control to allocate transmission data to a communication resource in the uplink line on the basis of analysis result of the communication resource allocation information by the control signal analysis section, and a transmission timing adjustment section for carrying out control to adjust transmission timing of the uplink line to synchronize with receiving timing in the base station, and one is selected from the random access channel having guard time and the control channel in the uplink line on the basis of existence of temporal synchronization and allocation of a communication resource in the uplink line at the time when transmission data is generated to carry out connection processing between the mobile station and the base station.

According to this configuration, a control signal analysis function to analyze the control signal transmitted from the base station and extract transmission timing information or schedule information, a schedule control function to adaptively use asynchronous RACH/control channel depending on the condition or the like of the mobile station to carry out mapping of a resource on the basis of schedule information from the base station and a transmission timing control function to carry out transmission timing correction on the basis of the transmission timing information from the base station can be utilized. Thus, it becomes possible to provide a mobile station apparatus following the EUTRA standard.

(32) Moreover, the mobile station according to the present invention, selection from the random access channel having guard time and the control channel in the uplink line is carried out by the schedule section or carried out on the basis of an instruction from the base station.

According to this configuration, control to adaptively use the asynchronous RACH/control channel depending on the condition or the like of the mobile station is carried out spontaneously by the mobile station or by an instruction from the base station (e.g., inserting instruction information in the schedule information).

(33) Further, the base station according to the present invention includes a channel detection section for detecting at least one of the random access channel having guard time and the control channel in the uplink line, a timing information generation section for generating temporal synchronization information in the uplink line, a schedule information generation section for generating communication resource allocation information, and a transmission section for transmitting the temporal synchronization information in the uplink line or the communication resource allocation information as control signal of the control channel in the downlink line to the mobile station.

According to this configuration, a signal transmitted from a mobile station is received and a channel detection function to detect at least one from the asynchronous random access channel (asynchronous RACH) and the control channel in the uplink line which can be commonly used by each mobile station (USCCH) included in a received signal, a function to generate transmission timing information (information for the temporal synchronization) on the basis of influence by multi-path in the received signal, a function to allocate a resource to each mobile station (a generation function of resource information) and a function to transmit the transmission timing information and resource information in a condition where the information are included in the control channel can be utilized. Thus, it becomes possible to provide a base station matching the EUTRA standard.

(34) Further, the communication system according to the present invention includes any of the above-mentioned mobile station and the base station.

Thus, it becomes possible to construct a mobile communication system following the EUTRA standard where an uplink can be established by new connection processing between a mobile station and the base station.

Effect of the Invention

In the present invention, two types of random access channel (RACH), an asynchronous RACH (with guard time)/synchronous RACH (without guard time), are prepared as a random access channel used before resource allocation and a control channel which can be commonly used by a plurality of mobile stations (a channel which carries out communication using an allocated resource. For example, a USCCH corresponds thereto) is added as a usable channel for a case where the mobile station transmits a new resource allocation request after allocation of a resource. Then, a new method to use the three channels adaptively depending on the condition of the mobile station classified by existence of temporal synchronization and resource allocation (and additionally taking type of data requesting resource information transmitted from the mobile station to the base station into consideration) is adopted. Thus, it becomes possible to realize new connection processing between the mobile station and the base station which can flexibly correspond to variation of actual mobile station condition or transmission procedure, can efficiently use a communication resource, and follows the EUTRA standard.

That is, in the connection processing in the uplink line between the mobile station and the base station in EUTRA, it becomes possible to clarify which communication channel is to be used in which case, taking efficient usage of a resource, communication quality, or the like into consideration. Therefore, the most suitable connection processing is realized in a multi-carrier communication system following the EUTRA standard.

Moreover, even if two types of information are transmitted simultaneously (specifically, in case if a mobile station transmits an uplink synchronization request and a resource allocation request simultaneously to the base station and in response thereto transmission timing information and resource information are simultaneously replied from the base station), such a case is taken into consideration for determination of a most suitable channel to be used. Therefore, a flexible correspondence is possible.

Further, effective usage of a synchronous RACH without guard time enables to raise usage efficiency of a resource in OFDM communication and to suppress waste of a resource usable for data communication or the like carried out collaterally.

Further, when mapping (allocating) the synchronous RACH/asynchronous RACH to a communication resource of OFDM regulated by a temporal axis and a frequency axis, various mapping methods (i.e., sub-frame division method, frequency band division method within a common sub-frame, a method for equally dispersing synchronous RACHs on a temporal axis while differing frequency band within one frame, a method for allocating both RACHs to a common sub-frame) are selectively used and mapping with wide variations is adaptively used to enable further efficient usage of a resource.

By the present invention, content of an uplink connection processing including RACH sequence in EUTRA can be specifically and objectively regulated and especially, a most suitable uplink channel usage method of the EUTRA can be provided.

According to the present invention, content of an uplink connection processing including RACH sequence in EUTRA can be specifically and objectively regulated and especially, a most suitable uplink channel usage method of the EUTRA can be provided.

Figure 1:
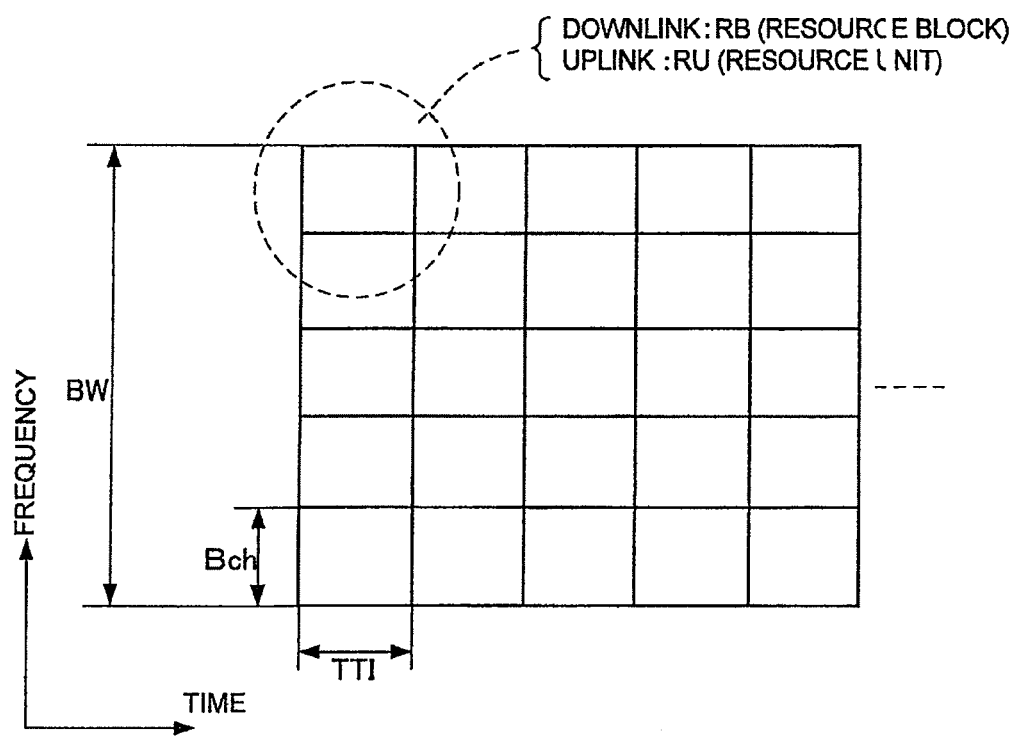
FIG. 1 A view for explaining resource allocation of a line according to EUTRA standard (using OFDM).

30 Receiving section
32 Channel demodulation section
34 Control signal analysis section
36 Decoding section
38 Channel measuring section
40 Transmission section
42 Channel modulation section
44 Encoding section
46 Schedule section
47 Transmission timing adjustment section
48 Control section (Upper layer)
50 Mobile station
70 ease station
72 Receiving section
74 Channel detection section
76 Scheduling section
78 Transmission timing information generation section
80 DSCCH generation section
82 Transmission section
AN1,AN2,AN3,AN4 Antenna

THE BEST MODE FOR CARRYING OUT THE CLAIMED INVENTION

Before detailed explanation on an embodiment is given, a general outline of a technique adopted by the EUTRA and basic technical content adopted by the present invention will be briefly explained.

FIG. 1 is a view for explaining resource allocation according to the EUTRA standard (using OFDM). As shown in the figure, a EUTRA radio frame is regulated by a temporal axis and a frequency axis. A frequency band which can be used matches a frequency band occupied by all the sub-carriers. Then the radio frame is divided into a plurality of resource blocks RB (hereinafter may be referred to as RB) in a downlink line. The resource block (RB) is a unit used when a base station allocates a communication resource to a mobile station existing in the same cell. The resource block (RB) is regulated by a predetermined frequency bandwidth (Bch) and a sub-frame interval on the temporal axis (Transmission Timing Interval: hereinafter referred to as TTI. TTI is equivalent to a sub-frame period). Here, the resource block (RB) is called a resource unit (hereinafter may be referred to as RU) in an uplink line. Therefore, in the present application, a term resource block (RB) will be used for the downlink line and a term resource unit (RU) will be used for the uplink line.

Figure 2:
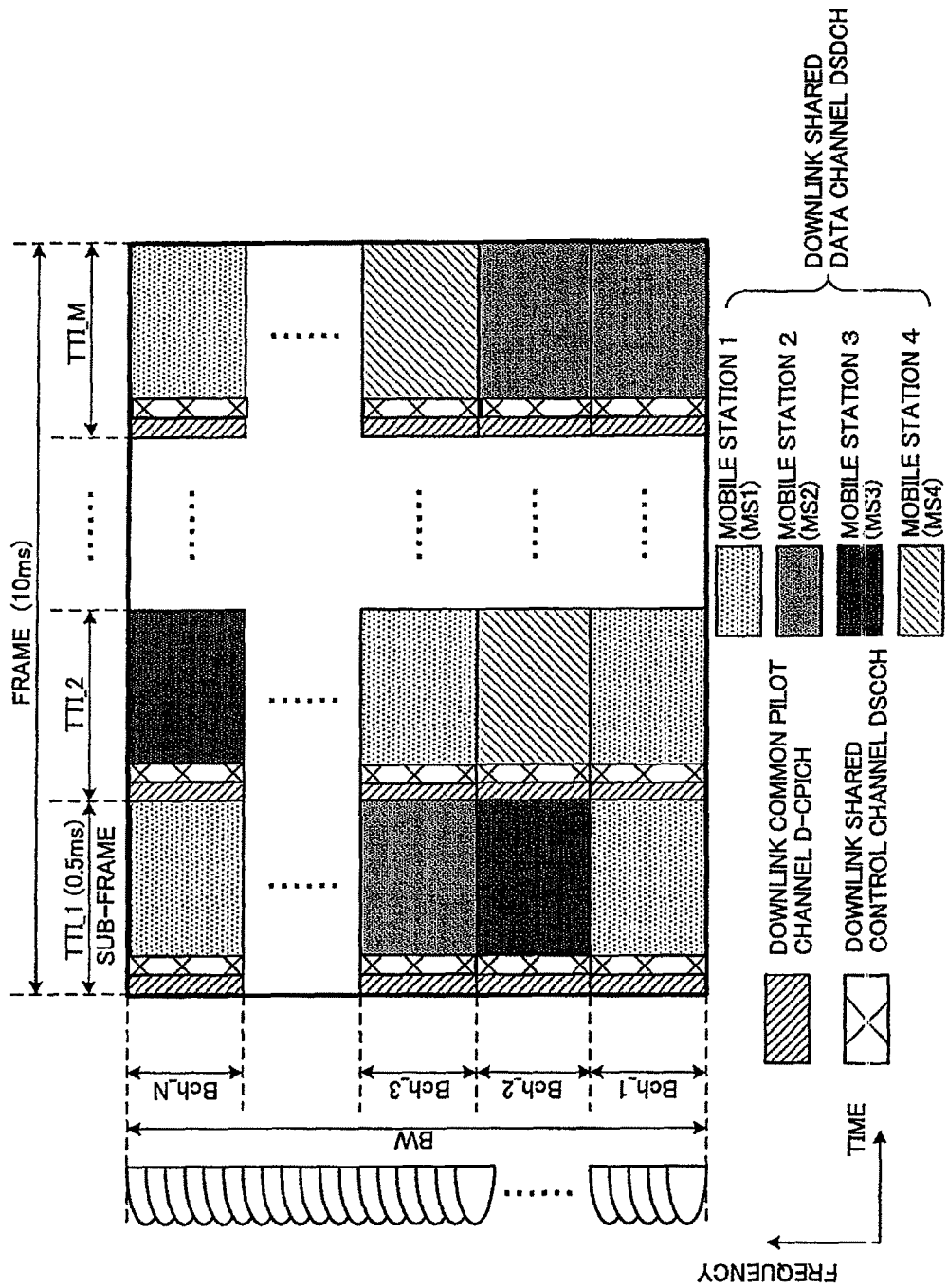
FIG. 2 A view showing an example of resource mapping in a downlink line according to the EUTRA standard (using OFDM).

FIG. 2 is a view showing an example of resource mapping in the downlink line according to the EUTRA standard (using OFDM). BW indicates a frequency bandwidth and Bch indicates a frequency bandwidth of a resource block (RB). In FIG. 2, a resource block (RB) is allocated to each of mobile station 1 (MS1) to mobile station 4 (MS4). Moreover, a downlink common pilot channel (D-CPICH), a downlink shared control channel (DSCCH), and a downlink shared data channel (DSDCH) are used.

Here, the downlink common pilot channel (D-CPICH) is a channel used for measuring quality of downlink radio link. Moreover, the downlink shared control channel (DSCCH) is a channel used to notify transmission power control, received data modulation method, schedule information, or the like. In addition, the downlink shared data channel (DSDCH) is a channel used for transmission of downlink user data Here, even if mapping configuration of the downlink channel differs from that of the present figure, the difference does not give any influence to the present invention. For example, a mapping configuration where DSCCH is included in the DSDCH is acceptable.

Figure 3:
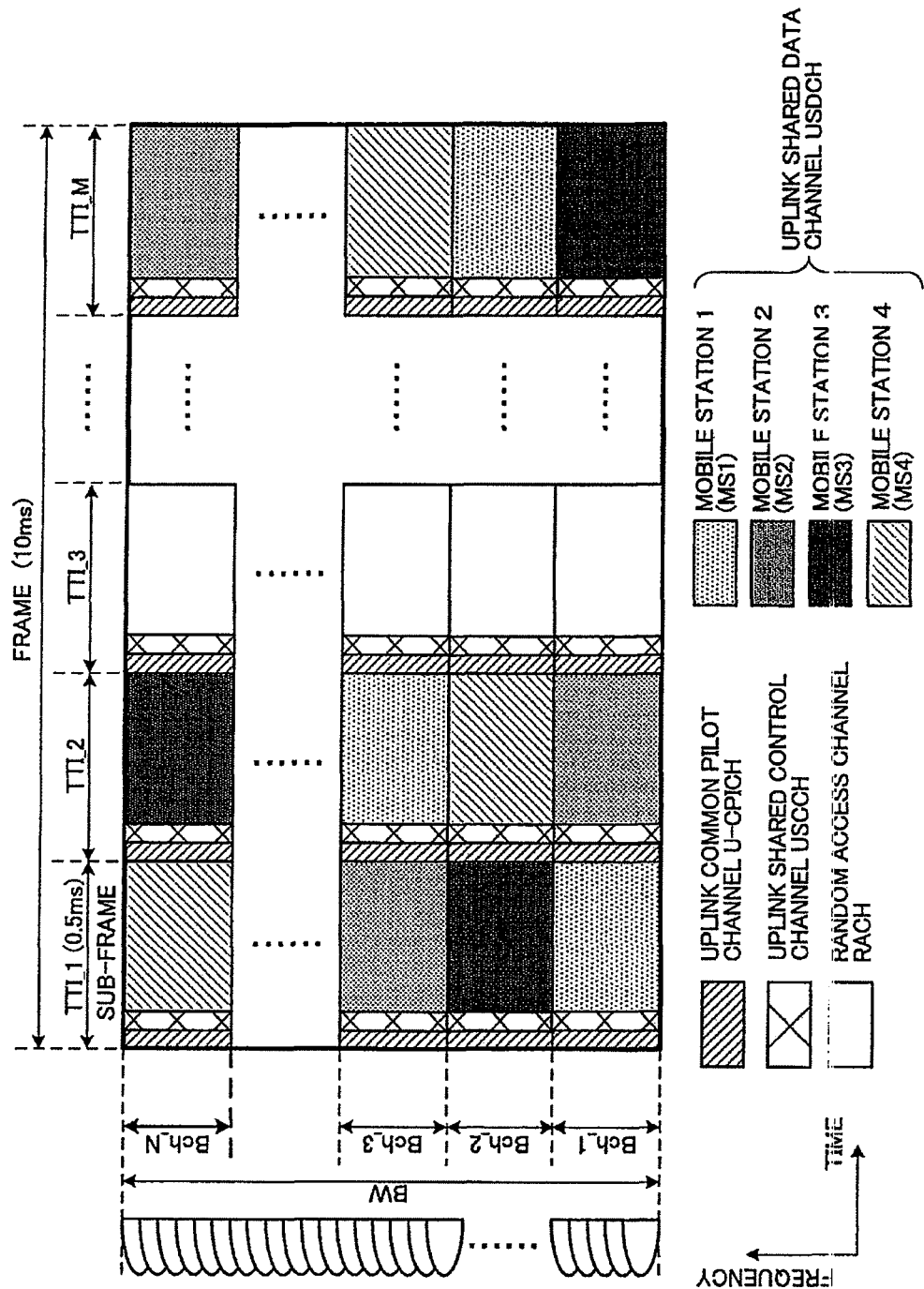
FIG. 3 A view showing an example of resource mapping in an uplink line according to the EUTRA standard (using OFDM).

FIG. 3 is a view showing an example of resource mapping in an uplink line according to the EUTRA standard (using OFDM). In FIG. 3, similarly to FIG. 2, a resource unit (RU) is allocated to each of mobile station 1 (MS1) to mobile station 4 (MS4) provided in a cell managed by the base station.

In FIG. 3, an uplink shared control channel (USCCH) is a channel used to notify quality information index CQI of a downlink data channel, HARQ, ACK/NACK, information regarding transmission data and the like to the base station.

An uplink common pilot channel (U-CPICH) is a channel used by the base station to assume quality of uplink radio path. An uplink shared data channel (USDCH) is a channel used to transmit uplink user data.

Moreover, a random access channel (RACH) is a channel used by a mobile station to carry out uplink resource allocation request when transmission is started.

In the present example, an example where a RACH is allocated to the whole of frequency band (SW) in a TTI (in the figure TTI_3) is shown. However, a plurality of RACHs may be allocated to an arbitrary resource unit (RU) or may be allocated to an arbitrary sub-frame interval. Here, if the uplink channel mapping configuration differs from that of the present figure, such a difference does not give any influence to the present invention. For example, a mapping configuration where USCCH is included in the USDCH is acceptable.

Figure 4:
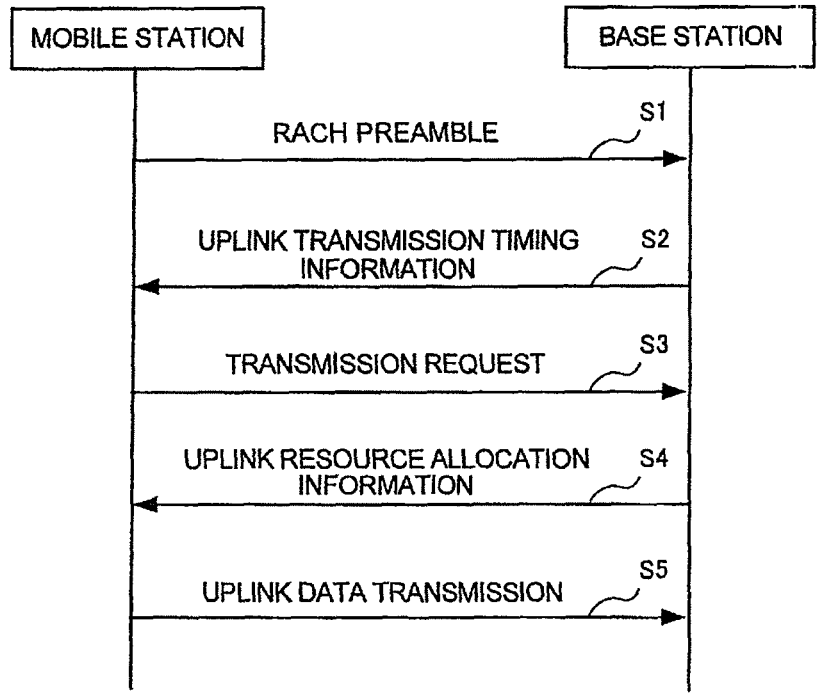
FIG. 4 A sequence chart showing an example of RACH sequence (an example where transmission timing information and resource information are simultaneously transmitted by different sequence) according to the EUTRA standard.

Next, variation of a RACH sequence according to the EUTRA standard will be explained. FIG. 4 is a sequence chart showing an example of a RACH sequence in the EUTRA standard (an example where transmission timing information and resource information are transmitted by respective sequence). In FIG. 4, the mobile station respectively transmits a RACH preamble and an uplink resource allocation request and in response thereto, the base station respectively replies uplink transmission timing information (transmission timing correction information) and uplink resource allocation information (resource information).

In FIG. 4, in a case where uplink data transmission is generated in a mobile station to which an uplink resource has not been allocated, the mobile station randomly selects a resource unit (RU) allocated as a RACH and transmits a RACH preamble in the selected resource unit (RU) (Step S1). The base station receives the RACH preamble, calculates difference in transmission timing of the mobile station from the actually received timing, and transmits correction information of transmission timing (uplink transmission timing information) to the mobile station (Step S2).

The mobile station adjusts transmission timing by the correction information and subsequently transmits a "transmission request" (Step S3). The "transmission request" is an uplink resource allocation request transmitted to the base station together with control information regarding transmission data. In the present application, terms such as "resource allocation request" or "transmission request" are also used but every of these terms has the same meaning.

The base station carries out scheduling of a necessary uplink resource from control information in the received transmission request and transmits uplink resource allocation information allocated according to the scheduling to the mobile station (Step S4).

Through the above-mentioned procedures, synchronization in the uplink line is established and a resource for transmission of data from the mobile station is allocated. Therefore, the mobile station uses the allocated uplink resource to start data transmission (Step S5).

Figure 5:
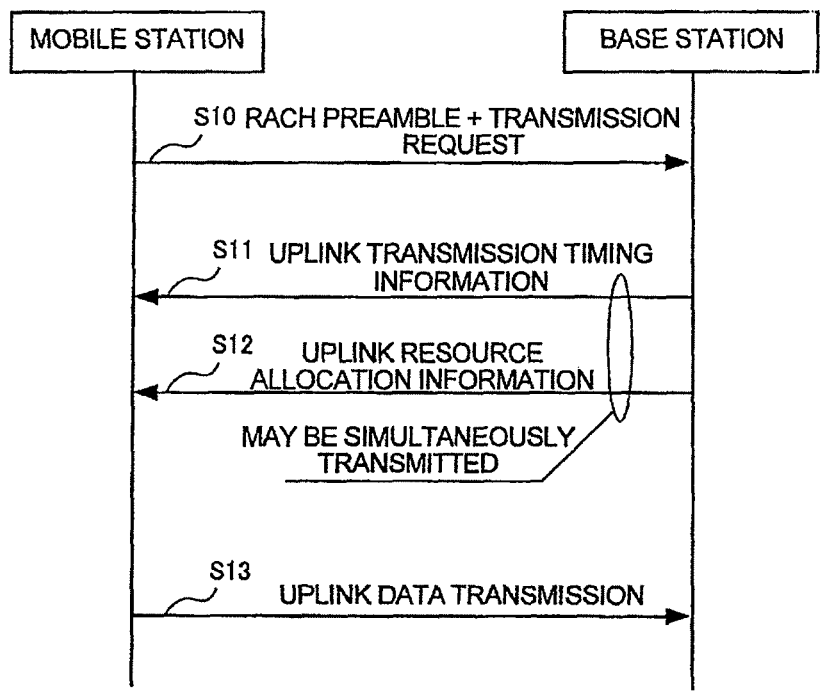
FIG. 5 A sequence chart showing another example of RACH sequence (an example where transmission timing information and resource information are simultaneously transmitted) according to the EUTRA standard.

FIG. 5 is a sequence chart showing another example of RACH sequence in the EUTRA standard (an example where uplink timing information and uplink resource allocation information are simultaneously transmitted). In FIG. 5, in a case where uplink data is generated in a mobile station to which an uplink resource has not been allocated, the mobile station randomly selects a resource unit (RU) allocated as a RACH and carries out transmission by including a RACH preamble and a transmission request in the selected resource unit (RU) (Step S10).

The base station receives the RACH preamble and the transmission request, calculates difference in transmission timing of the mobile station from the actually received timing, and transmits correction information of transmission timing (uplink transmission timing information) to the mobile station (Step S11). Moreover, the base station carries out scheduling of a necessary uplink resource from information in the transmission request and transmits uplink resource allocation information allocated according to the scheduling to the mobile station (Step S12). Here, the transmission timing correction information (uplink transmission timing information) and the uplink resource allocation information may be transmitted simultaneously from the base station.

Then the mobile station adjusts transmission timing using correction information of transmission timing (uplink transmission timing information) and starts data transmission using the allocated uplink resource (Step S13).

Moreover, in the present invention, two types of random access channel, an asynchronous RACH and a synchronous RACH, are prepared as random access channels which enable the mobile station to transmit at an arbitrary timing. The RACHs are selectively used depending on the actual condition of the mobile station.

Hereinafter, the asynchronous RACH/synchronous RACH will be briefly explained. The asynchronous RACH does not acquire correction information of uplink timing from the base station and is a RACH used in a condition where uplink timing is not corrected. On the other hand, the synchronous RACH is a RACH used in a condition where transmission timing is corrected.

Because the RACH is originally a channel for a mobile station to carryout transmission at an arbitrary timing to a base station, it is generally assumed that temporal synchronization between the base station is not established at this point of time (in case of verbal communication, only such a case can be assumed). However, in case of data packet communication, there is a case where the RACH is transmitted from the mobile station to the base station in a condition where temporal synchronization between the base station is established. For example, a case where an uplink between the base station is established (transmission timing difference is corrected) and subsequently, before the link disappears, (while correction of timing difference is valid) data transmission of a new uplink is required and the mobile station transmits RACH to the base station corresponds to this a case. In such a case, for example, if the RACH is transmitted at the timing that matches top of a frame of a synchronized link, timing matches receiving timing in the base station. Therefore, the RACH in this case can be called a synchronous RACH.

The asynchronous RACH needs to set guard time (a redundant period which is extension of a unique code multiplied to the RACH) to reduce influence of multi-path when mapping the data to a sub-carrier and transmitting to the base station. However, the synchronous RACH does not need the guard time. Therefore, effective usage of the synchronous RACH enables efficient usage of a communication resource.

Figure 6:
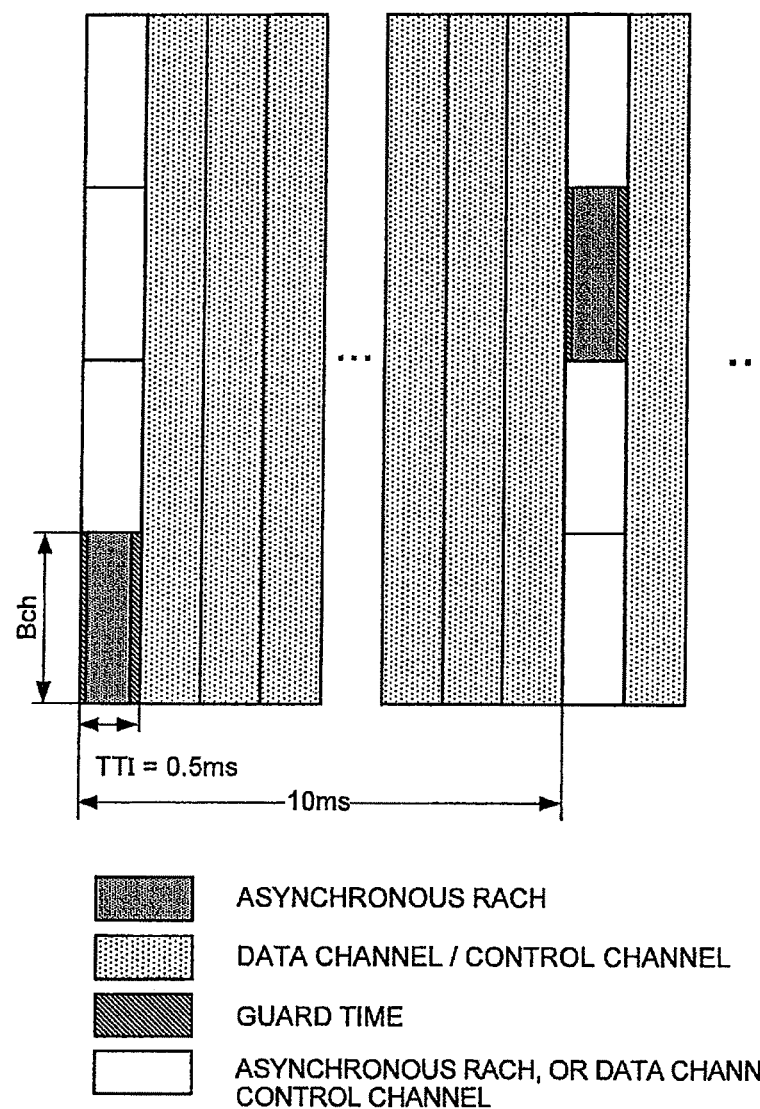
FIG. 6 A view showing an example of mapping an asynchronous RACH to a resource unit in a radio frame.

FIG. 6 is a view showing an example of mapping of an asynchronous RACH. As shown in the figure, the asynchronous RACH has guard time and the asynchronous RACH including the guard time occupies one sub-frame interval (TTI=0.5 ms).

Figure 7:
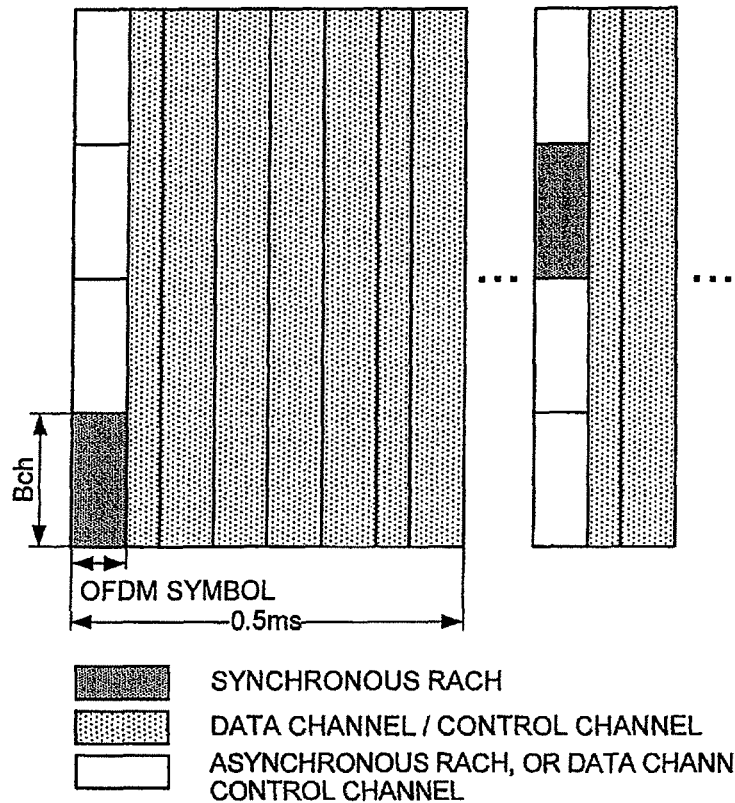
FIG. 7 A view showing an example of mapping a synchronous RACH to a resource unit in a radio frame.

FIG. 7 is a view showing an example of mapping of a synchronous RACH to a resource unit in a radio frame. As shown in the figure, since the synchronous RACH does not require guard time and synchronization is ensured, minimum duration of the synchronous RACE matches duration of OFDM symbol. That is, because there is no redundant guard time, duration is greatly shortened. Therefore, a vacant portion of the sub-frame interval (TTI=0.5 ms) can be allocated to a data channel or a control channel. If the synchronous RACH is efficiently used as mentioned, it becomes possible to effectively use a communication resource.

Moreover, while the RACH is a channel used before allocation of a resource (for resource allocation request), there may be a case where a request for new resource allocation needs to be transmitted even after allocation of a resource. In such a case, it is conceivable that instead of the RACH, for example, an uplink shared control channel USCCH (a channel for carrying out transmission using allocated resource) may be used.

Then, in the connection processing method of the present invention, other than the synchronous RACH and the asynchronous RACH, a control channel which can be commonly used by a plurality of mobile stations (e.g., the uplink shared control channel (USCCH) corresponds thereto) is assumed as a channel having a possibility to be used in uplink.

The USCCH is a transmission timing difference corrected (uplink synchronized) channel for transmission using a resource allocated by the base station and the mobile station can use the channel for transmission of a channel quality indicator (CQI), hybrid auto repeat request (hybrid ARQ), ACK/NACK, or the like to the base station. As mentioned above, it is assumed that there may be a case where a new resource allocation request is transmitted using the resource currently allocated and the uplink shared control channel (USCCH) if new transmission data is generated after a resource is allocated from the base station. Therefore, the uplink shared control channel (USCCH) is also a channel having a possibility to be used for uplink connection processing.

Therefore, resultingly, channels having a possibility to be used for uplink connection processing include the asynchronous RACH and the synchronous RACH as channels used before allocation of a resource, and an uplink shared control channel (USCCH) as a channel used after allocation of a resource, and there are three channels in total. Here, a specific name of the "commonly usable control channel" is not especially specified. However, in the following explanation, for easy of explanation, the channel will be described as the uplink shared control channel (USCCH) (however, the channel is not limited thereto and in case if usage of other channel is allowed in EUTRA, that control channel may be used).

Moreover, in the present invention, the synchronous RACH, the asynchronous RACH, and the USCCH are adaptively used taking, especially, usage efficiency of a resource, uplink resource allocation condition in the mobile station, and uplink time synchronization condition into consideration. That is, condition of the mobile station at the time when transmission data is generated in the mobile station is classified depending on whether there is temporal synchronization or whether there is allocation of a resource, and depending on the necessity, classified by the type of information requesting allocation of a resource which is transmitted from the mobile station to the base station (i.e., there may be a case where types of a signal used for request of schedule information is taken into consideration for classifying because a signal notifying existence of transmission data, a signal notifying volume of transmission data, a signal notifying types and rate of transmission data, a signal notifying transmission buffer volume, or many other signals can be used as a request signal for schedule information of a resource). Then, if transmission data is actually generated in the mobile station, depending on the condition of the mobile station thus classified, one channel is adaptively selected from the above three channels.

In other words, in the following embodiments, actual situation of an OFDM mobile communication is specifically assumed and environmental condition where connection processing is carried out is set. Then, under the condition setting, most suitable usage channels will be determined for the above-mentioned four cases. Basic conditions set in the following embodiments are as follows:

(a) Condition pattern 1 (embodiments 1 and 2)
(1) Uplink synchronization request signal and resource allocation request signal can be simultaneously transmitted.
(2) Synchronous RACH is not used.
(3) USCCH can be used for resource allocation request.
(b) Condition pattern 2 (embodiment 3)
(1) Uplink synchronization request signal and resource allocation request signal cannot be simultaneously transmitted (transmitted respectively).
(2) USCCH is not used.
(3) Synchronous RACH can be used for resource allocation request.

(c) Condition pattern 3 (embodiments 4 to 7)
(1) Uplink synchronization request signal and resource allocation request signal cannot be simultaneously transmitted (transmitted respectively).
(2) Synchronous RACH can be used for resource allocation request.
(3) USCCH can be used for resource allocation request.

Here, the condition pattern 3 is the most important condition and according to the condition pattern 3, basic usage method of uplink will be as follows: Asynchronous RACH is used to request timing correction information. Moreover, in case of a resource allocation request, USCCH is used when there is a resource and synchronous RACH is used when there is no resource.

Figure 8:
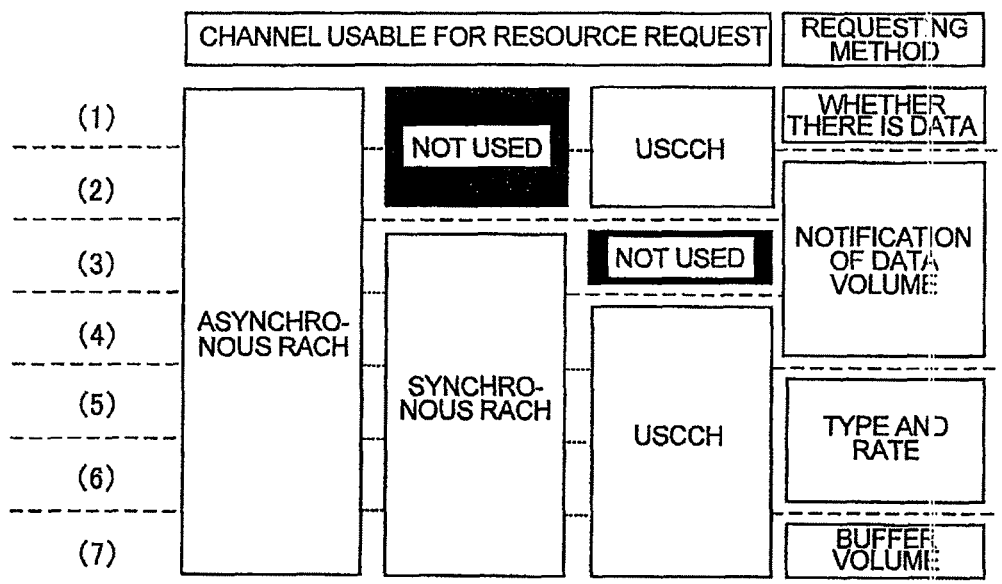
FIG. 8 A view in which seven embodiments of the present invention are classified by a usable channel and a resource requesting method.

Next, classification of contents shown in the following explanation on embodiments (embodiments 1 to 7) will be briefly explained. FIG. 8 is a view in which contents of each of seven embodiments of the present invention are classified by a usable channel and a resource requesting method.

In FIG. 8, each of (1) to (7) shown on the left side indicates embodiments 1 to 7, respectively. At the center, a channel usable for a resource request is shown. Then, on the right side, a resource requesting method (type of data used for the request, or the like) is shown. See the following.

(1) In the embodiment 1, asynchronous RACH and USCCH are used and a mobile station transmits information notifying whether there is transmission data or not to a base station to carry out a resource allocation request.
(2) In the embodiment 2, asynchronous RACH and USCCH are used and a mobile station transmits information notifying data volume of transmission data to a base station to carry out a resource allocation request.
(3) In the embodiment 3, asynchronous RACH and synchronous RACH are used and a mobile station transmits information notifying data volume of transmission data to a base station to carry out a resource allocation request.
(4) In the embodiment 4, asynchronous RACH, synchronous RACH, and USCCH are used and a mobile station transmits information notifying data volume of transmission data to a base station to carry out a resource allocation request.
(5) In the embodiment 5, asynchronous RACH, synchronous RACH, and USCCH are used and a mobile station transmits information notifying type of transmission data or fixed transmission rate to a base station to carry out a resource allocation request.
(6) In the embodiment 6, asynchronous RACH, synchronous RACH, and USCCH are used and a mobile station transmits information notifying type of transmission data or variable transmission rate to a base station to carryout a resource allocation request.
(7) In the embodiment 7, asynchronous RACH, synchronous RACH, and USCCH are used and a mobile station transmits untransmitted data buffer volume to a base station to carry out a resource allocation request.

Moreover, in the following embodiments, condition of the mobile station is classified depending on uplink synchronization/non-synchronization and whether there is uplink resource information or not and for each case, it is considered and determined that which channel is most suitable. That is, in the present invention, a condition where a mobile station in EUTRA transmits a transmission request is classified into four: (1) No uplink resource information, uplink asynchronous, (2) no uplink resource information, uplink synchronous, (3) uplink resource information, uplink asynchronous, and (4) uplink resource information, uplink synchronous.

Here, "no uplink resource information" means a condition where an uplink resource for transmitting a transmission request by USCCH is not allocated to the mobile station. For example, an idle condition in EUTRA corresponds to this condition. Moreover, a case where condition is in active and a mobile station starts subsequent transmission before the condition shifts to idle condition right after finishing transmission of certain transmission data corresponds to this condition (in this case, there is no resource for the newly generated transmission data).

On the other hand, "there is uplink resource information" means a condition where an uplink resource for transmitting a transmission request by USCCH is already allocated to the mobile station. For example, a case where adaptive allocation of a resource necessary for data transmission is required because of a reason such as increase/decrease in transmission rate or transmission buffer volume in active condition in the EUTRA corresponds to this condition.

Moreover, "uplink asynchronous" means a condition before a mobile station corrects difference in transmission timing by correction information or a condition where the mobile station does not receive the correction information for a predetermined period of time so that effective period of the correction information expires and uplink is out of synchronization.

On the other hand, "uplink synchronous" is a condition where a mobile station corrects difference in transmission timing by correction information and the correction information is in valid duration.

Moreover, in the following embodiments, actual condition of a mobile station is appropriately considered. That is, as specific condition of a mobile station in EUTRA, "detached condition", "idle condition", and "active condition" are conceivable.

The "detached condition" is a condition where the base station does not recognize the existence of the mobile station because of a reason such as the mobile station is just turned on, or the mobile station has just transited to a difference RAT (radio access technology).

The "idle condition" means a condition where the base station recognizes the existence of the mobile station yet data communication therebetween is not carried out, the base station allocates downlink resource minimum for incoming to the mobile station, and the mobile station intermittently receives data by the resource thus allocated.

The "active condition" means a condition where the base station recognizes existence of the mobile station and data communication is carried out between the base station and the mobile station.

Taking the above into consideration, embodiments of the present invention will be specifically explained below.

Embodiment 1

Figure 9:
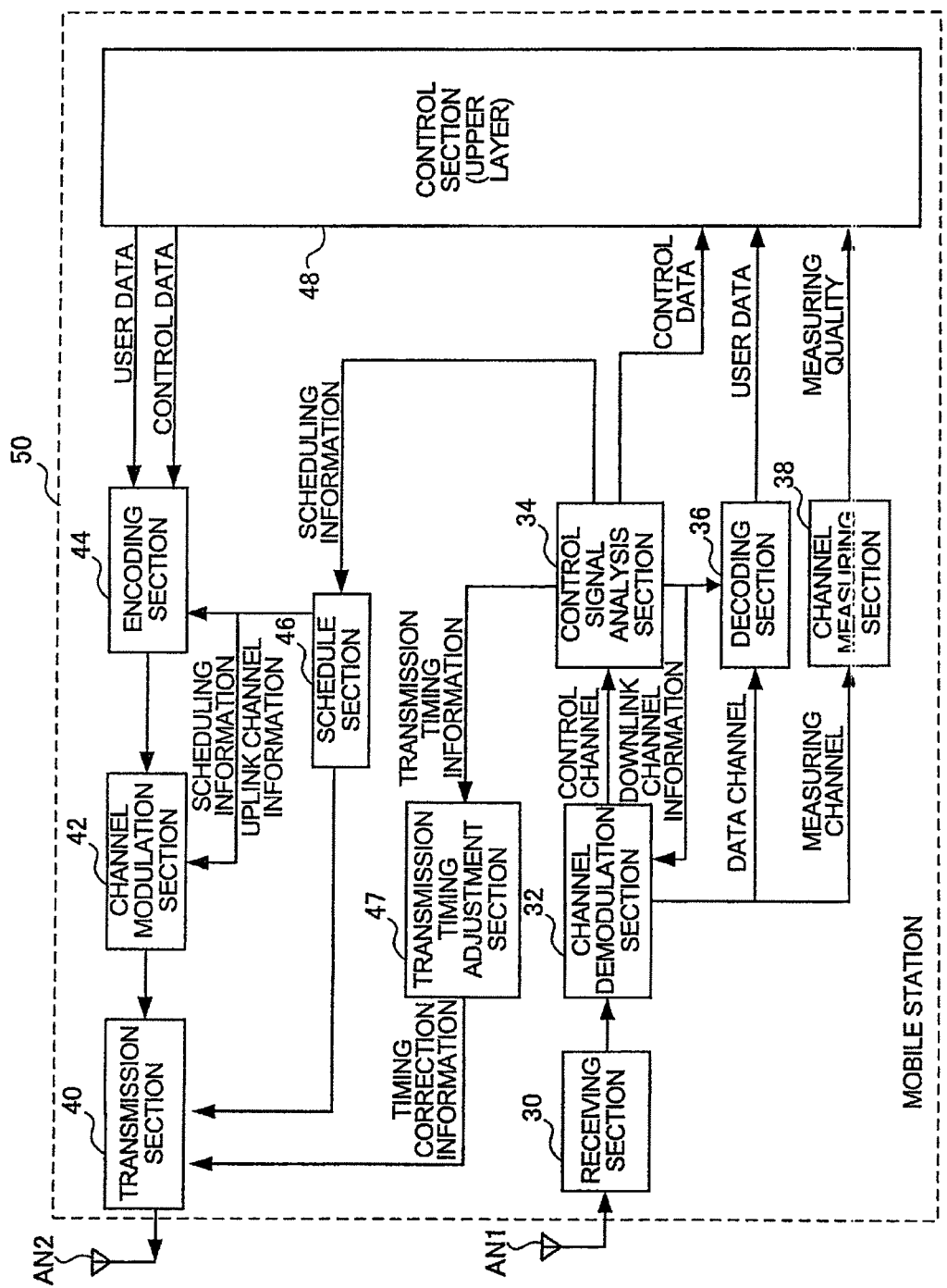
FIG. 9 A block diagram showing an example of a configuration of a mobile station.

Hereinafter, an embodiment 1 according to the present invention will be explained. FIG. 9 is a block diagram showing an example of configuration of a mobile station. A mobile station 50 corresponds to EUTRA (using OFDM) and includes an antenna AN1, a receiving section 30, a channel modulation section 32, a control signal analysis section 34, a decoding section 36, and a channel measuring section 38 as a receiving system and an antenna AN2, a transmission section 40, a channel demodulation section 42, an encoding section 44, a schedule section 46, and a transmission timing adjustment section 47 as a transmission system as shown in the figure. Moreover, operation of each section is holistically controlled by a control section 48 as an upper layer.

Next, operation of the mobile station in FIG. 9 will be explained. A signal from a base station is received by the receiving section 30 through the antenna AN1. The received signal is sent to the channel modulation section 32 and modulation processing corresponding to the type or content of the received signal is carried out. The received signal thus modulated is transmitted to each processing sections (reference numerals 34 to 38) corresponding to the received channel type.

That is, a control channel is transmitted to the control signal analysis section 34, a data channel is transmitted to the decoding section 36, and a measuring channel is transmitted to the channel measuring section 38. Here, the "control channel" means the DSCCH, an annunciation information channel, or the like, the "data channel" means the DSDCH or the like, and the "measuring channel" means the D-CPICH or the like. The control signal analysis section 34 extracts control data, downlink channel information, transmission timing information, and scheduling information from the control channel.

The downlink channel information includes information necessary for decoding and modulation and the downlink channel information is provided to the decoding section 36 and the channel modulation section 32 respectively. Moreover, the transmission timing information is transmitted to the transmission timing adjustment section 47. Further, the scheduling information is transmitted to the schedule section 46.

The decoding section 36 takes user data out from the data channel on the basis of the downlink channel information. The channel measuring section 38 takes measuring quality out from the measuring channel. The control data, user data, and measuring quality are sent to the control section 48 as an upper layer.

Meanwhile, upon transmission request from the control section 48 (upper layer), the user data and control data are inputted into the encoding section 44 to be encoded. The user data and control data thus encoded are inputted into the channel demodulation section 42 to be modulated. Uplink channel information necessary for encoding and modulating the user data and control data is specified by the schedule section 46.

Moreover, according to the scheduling information transmitted from the schedule section 46, each transmission data is mapped to an appropriate uplink channel (RACH, USCCH, USDCH, or the like). In addition, the transmission section 40 adjusts transmission timing on the basis of correction information obtained from the transmission timing adjustment section so that the transmission timing synchronizes with receiving timing on the base station. Here, other configuration elements of the mobile station are not related to the present invention and therefore explanation thereof is omitted here.

Figure 10:
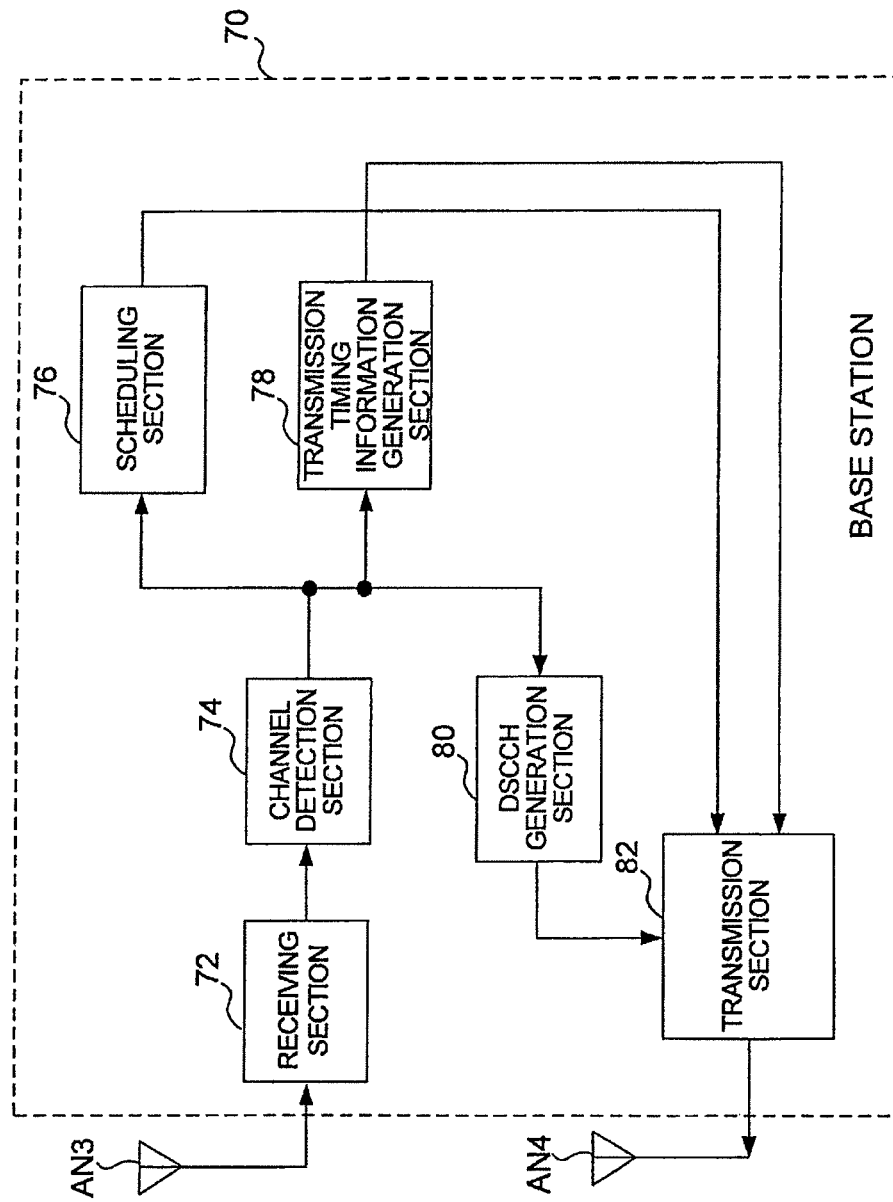
FIG. 10 A block diagram showing an example of a configuration of a base station.

FIG. 10 is a block diagram showing an example of a configuration of a base station. A base station 70 corresponds to EUTRA (using OFDM) and includes an antenna AN3, a receiving section 72, a channel detection section 74, a scheduling section 76, a transmission timing information generation section 78, a downlink shared control channel (DSCCH) generation section 80, and a transmission section 82.

The channel detection section 74 detects a RACH (a synchronous RACH or a asynchronous RACH) or an uplink shared control channel (USCCH) from a received signal and detects a request of transmission timing information and a resource allocation request from a mobile station. The scheduling section 76 generates schedule information (resource allocation information) and the transmission timing information generation section 78 generates transmission timing information (transmission timing correction information).

The DSCCH generation section 80 configures a transmission frame including a DSCCH and the transmission section 82 maps the schedule information and the transmission timing information in the DSCCH and transmits to the mobile station from the antenna AN3.

Figure 11:
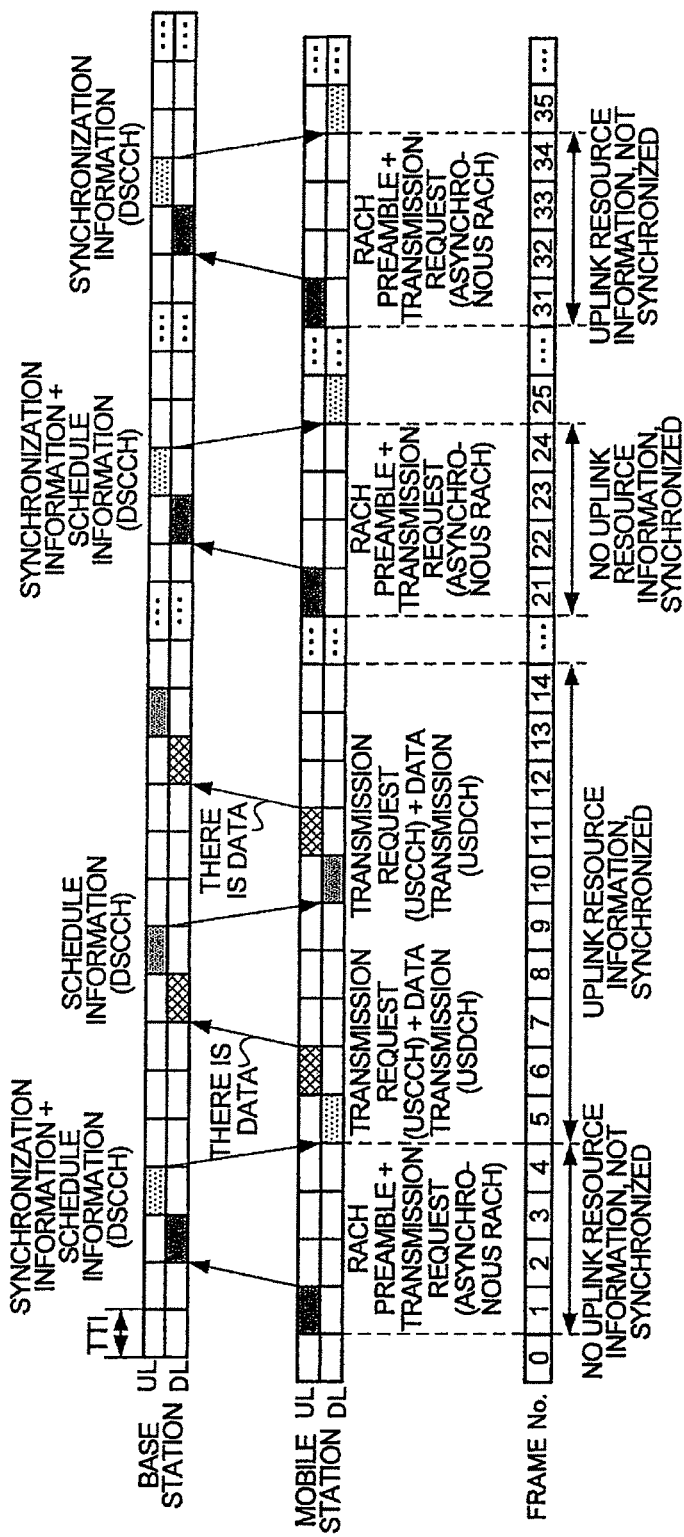
FIG. 11 A view showing an example of a series of procedures (and content) of uplink connection processing between a mobile station and a base station.

FIG. 11 is a view showing an example of a series of procedures (and content) of uplink connection processing between a mobile station and a base station. In FIG. 11, the top row is a base station, wherein UL means an uplink line seen from the base station (a line from the base station to a mobile station) and DL means a downlink line seen from the base station (a line from the mobile station to the base station). Moreover, the center row of FIG. 11 is a mobile station, wherein UL means an uplink line seen from the mobile station (a line from the mobile station to the base station) and DL means a downlink line seen from the mobile station (a line from the base station to the mobile station). In addition, frame numbers in the bottom row of FIG. 11 show serial numbers of transmission frames. Same is applied to following figures.

Communication procedures of connection processing shown in FIG. 11 is preferable in a case where the following conditions (1) to (3) are satisfied.
(1) RACH preamble and a transmission request can be simultaneously included in one RACH transmission.
(2) USCCH includes a function to notify whether there is transmission data and is used for requesting allocation of a resource.
(3) A synchronous RACH is not used.

At this time, the mobile station uses an "asynchronous RACH" for a transmission request (resource allocation request) from "a condition where there is no uplink resource information and uplink is not synchronized" and "a condition where there is no uplink resource information and uplink is synchronized". Moreover, the mobile station uses a "USCCH" every time as long as transmission data last for a transmission request from "a condition where there is uplink resource information and uplink is synchronized".

Hereinafter, the transmission procedures in FIG. 11 will be explained in detail. In the initial transmission, that is, when "there is no uplink resource information and uplink is not synchronized," the USCCH cannot be used because an uplink resource is not allocated. Therefore, in the initial transmission, an asynchronous RACH is the most suitable (frame 1 in the figure).

Transmission requests after the initial transmission are transmitted after transmission timing information and schedule information are received. That is, when there is uplink resource information and uplink is synchronized, an uplink resource is allocated to the mobile station by the transmission timing information and the schedule information and therefore, usage of an asynchronous RACH having a possibility to cause interference between other stations means bad usage efficiency of a resource. Therefore, the USCCH is the most suitable for the transmission request (frames 6 and 11 in the figure). The mobile station follows the schedule information notified from the base station by the DSCCH (frames 5 and 10 in the figure) and transmits data using the USDCH. Here, the USCCH and USDCH may be simultaneously transmitted.

The mobile station notifies information indicating "there is transmission data" as long as there is transmission data and when there is no transmission data, notifies information indicating "there is no transmission data" to the base station every time using the USCCH. Here, instead of notifying "there is no transmission data", the mobile station may implicitly notify the base station by not notifying "there is transmission data."

Moreover, in case if new transmission data is generated after all the transmission data are transmitted and before uplink line is out of sync, that is, there is no uplink resource information and uplink line is synchronized, because no uplink resource is allocated, the USCCH cannot be used. Therefore, in this case, asynchronous RACH is most suitable (frame 21 in the figure).

In addition, in a condition where the base station allocates an uplink resource to the mobile station but transmission timing of the mobile station is not corrected yet, that is, when there is uplink resource information and uplink is not synchronized, the USCCH cannot be used until timing information is received from the base station. Therefore, in such a case, an asynchronous RACH is most suitable (frame 31 in the figure).

Embodiment 2

Figure 12:
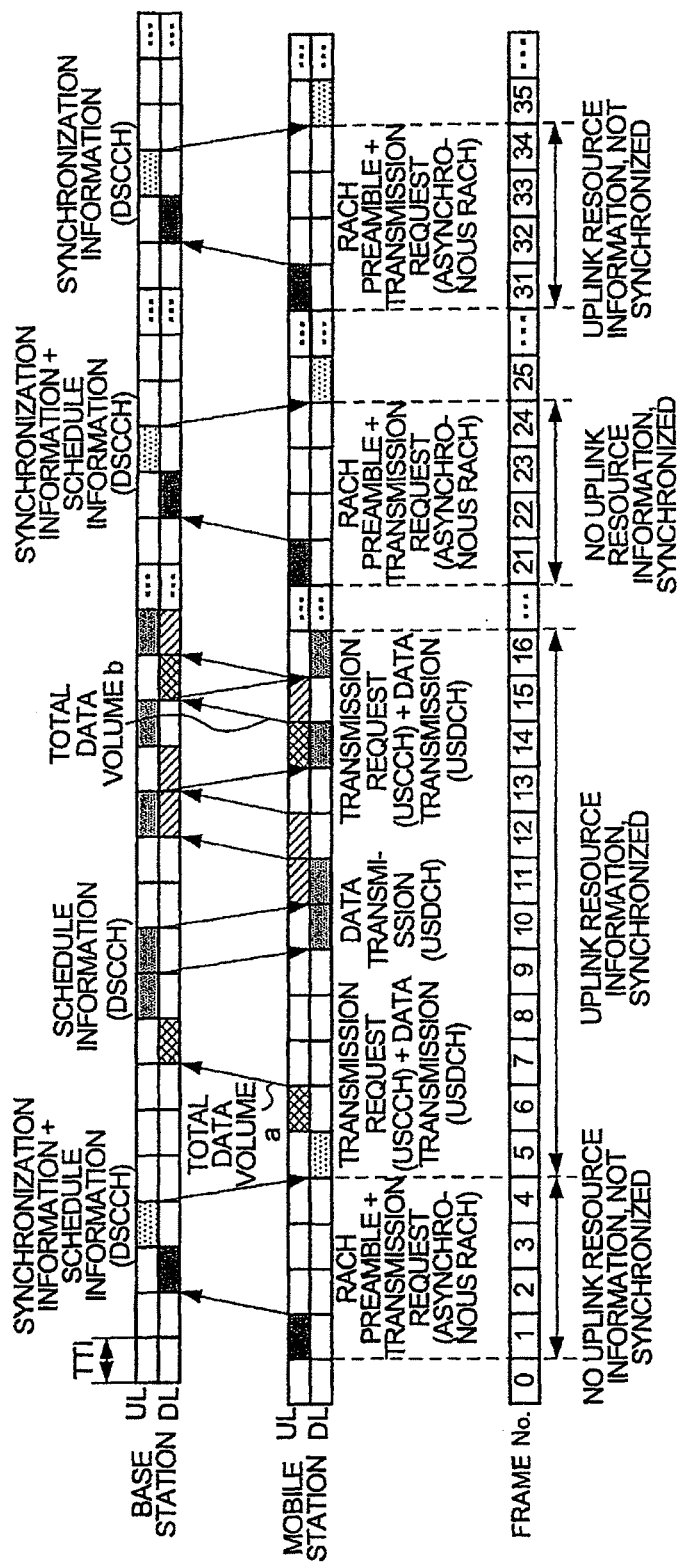
FIG. 12 A view showing other example of a series of procedures (and content) of uplink connection processing between a mobile station and a base station.

An embodiment 2 according to the present invention will be explained below. Configuration of a mobile station and a base station may be the same as those in the embodiment 1. FIG. 12 is another view showing an example of a series of procedures (and content) of an uplink connection processing between a mobile station and a base station. Communication procedures of connection processing shown in FIG. 12 are preferable in a case where the following conditions (1) to (3) are satisfied.
(1) RACH preamble and a transmission request can be simultaneously included in one RACH transmission.
(2) USCCH includes a function to notify transmission data volume and is used for requesting allocation of a resource.
(3) A synchronous RACH is not used.

At this time, the mobile station uses an "asynchronous RACH" for a transmission request from "a condition where there is no uplink resource information and uplink is not synchronized" and "a condition where there is no uplink resource information and uplink is synchronized". Moreover, the mobile station uses a "USCCH" to a transmission request from "a condition where there is uplink resource information and uplink is synchronized" when transmission data is generated.

Hereinafter, the transmission procedures in FIG. 12 will be explained in detail. In the initial transmission, that is, when "there is no uplink resource information and uplink is not synchronized," the USCCH cannot be used because an uplink resource is not allocated. Therefore, in the initial transmission, an asynchronous RACH is the most suitable (frame 1 in the figure).

Transmission requests after the initial transmission are transmitted after transmission timing information and schedule information are received. That is, when there is uplink resource information and uplink is synchronized, an uplink resource is allocated to the mobile station by the transmission timing information and the schedule information and therefore, usage of an asynchronous RACH having a possibility to cause interference between other stations means bad usage efficiency of a resource. Therefore, the USCCH is the most suitable for the transmission request (frames 6 and 14 in the figure). The mobile station includes total volume of data to be transmitted in a USCCH and transmits it as a transmission request only once (frame 6 in the figure). Moreover, every time new transmission data is generated, the mobile station includes total volume of data to be transmitted in the USCCH and transmits it as a transmission request only once (frame 14 in the figure). In a case other than the transmission request, the mobile station transmits data using the USDCH according to schedule information notified by the DSCCH from the base station (frames 10, 11, or the like). Here, the USCCH and the USDCH may be simultaneously transmitted at this time.

Further, in case if new transmission data is generated after all the transmission data are transmitted and before uplink line is out of sync, that is, there is no uplink resource information and uplink line is synchronous, because no uplink resource is allocated, the USCCH cannot be used. Therefore, in this case, asynchronous RACH is most suitable (frame 21 in the figure).

Further, in a condition where the base station allocates an uplink resource to the mobile station but transmission timing of the mobile station is not corrected yet because of a reason such as handover has been just carried out, that is, when there is uplink resource information and uplink is not synchronized, the USCCH cannot be used until timing information is received from the base station. Therefore, in such a case, an asynchronous RACH is the most suitable (frame 31 in the figure).

Embodiment 3

Figure 13:
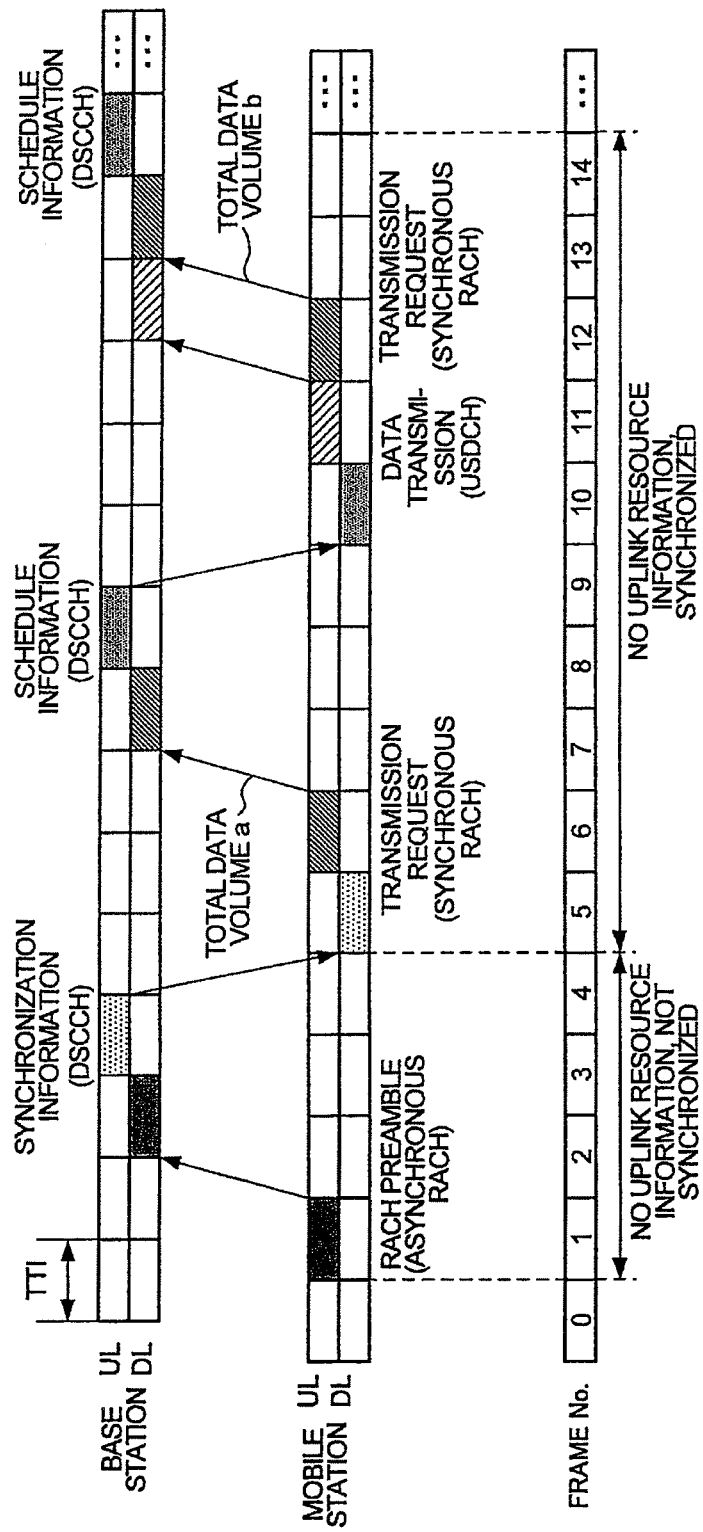
FIG. 13 A view showing other example of a series of procedures (and content) of uplink connection processing between a mobile station and a base station.

An embodiment 3 according to the present invention will be explained below. Configuration of a mobile station may be the same as that in the embodiment 1. FIG. 13 is another view showing an example of a series of procedures (and content) of an uplink connection processing between a mobile station and a base station. Communication procedures shown in FIG. 13 are preferable in a case where the following conditions (1) to (3) are satisfied.
(1) RACH preamble and a transmission request cannot be simultaneously included in one RACH transmission.
(2) USCCH is not used for requesting allocation of a resource.
(3) A synchronous RACH has a function to notify transmission data volume and is used for a resource allocation request.

At this time, the mobile station uses an "asynchronous RACH" for a transmission request (a resource allocation request) from "a condition where there is no uplink resource information and uplink is not synchronized". Moreover, the mobile station uses a "synchronous RACH" for a transmission request from "a condition where there is no uplink resource information and uplink is synchronized". Here, there is no need to take a condition where there is uplink resource information and uplink is synchronized and a condition where there is uplink resource information and uplink is not synchronized into consideration under the above-mentioned conditions.

Hereinafter, the transmission procedures in FIG. 13 will be explained in detail. In the initial transmission, that is, when "there is no uplink resource information and uplink is not synchronized," the USCCH cannot be used because an uplink resource is not allocated. Therefore, in the initial transmission, an asynchronous RACH is the most suitable (frame 1 in the figure).

The transmission request is transmitted after receiving transmission timing information alone. That is, when there is no uplink resource information and uplink is synchronized, uplink from the mobile station is corrected by the transmission timing information and therefore the synchronous RACH is the most suitable for the transmission request (frames 6 and 12 in the figure).

The mobile station includes data volume to be transmitted in a synchronous RACH and transmits it only once (frame 6 in the figure). Because there is no allocation of a resource for the transmission request, the mobile station includes data volume to be transmitted in the synchronous RACH every time transmission data is generated and transmits only once (frame 12 in the figure). In FIG. 13, it is shown that scheduling is carried out in the base station on the basis of total data volume a notified by the frame 6, scheduling is carried out in the base station, schedule information is notified to the mobile station by the DSCCH (frame 10 in the figure), and data is transmitted by the USDCH according to the schedule information (frame 11 in the figure).

Here, in the present embodiment, USCCH is not used for the transmission request and conditions where there is uplink resource information and uplink is synchronized and where there is uplink resource information and uplink is not synchronized do not exist. Therefore, it is not necessary for the mobile station to take the above-mentioned two conditions into consideration.

In the present embodiment, because the asynchronous RACH and the synchronous RACH are used, how these two channels are mapped in a radio frame (communication resource) becomes a problem (i.e., how to carry out channel mapping).

Therefore, how to carry out channel mapping of the synchronous/asynchronous RACH will be explained below. FIGS. 15 to 18 are views showing examples of channel mapping of the synchronous/asynchronous RACH. Here, in each figure, a guard band of the asynchronous RACH is omitted. Moreover, to simplify the views, it is described that temporal axis of the synchronous RACH occupies all of 1 TTI. However, in actuality, the synchronous RACH may be mapped in an arbitrary OFDM symbol and the number may be an arbitrary OFDM symbol number within 1 TTI.

Figure 15:
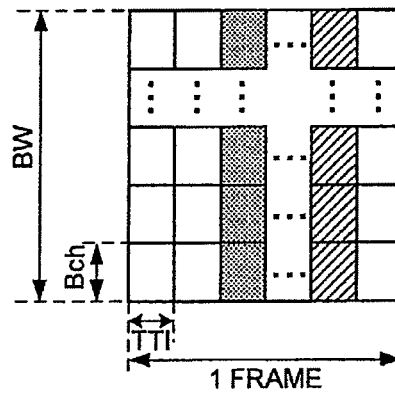
FIG. 15 A view showing an example of channel mapping a synchronous RACH/asynchronous RACH (an example where each of the asynchronous RACH and the synchronous RACH is provided in different TTI).

In FIG. 15, the asynchronous RACH and the synchronous RACH are provided in different TTIs (sub-frame periods). The asynchronous RACH and the synchronous RACH are mapped along all the frequency bandwidth (BW) regarding the frequency axis and are mapped in different TTIs regarding the temporal axis. In the figure, the synchronous RACH is provided after the asynchronous RACH. However, the order may be inverted.

Moreover, the RACHs may be provided in different frames and each of the RACHs may be continuously provided. In the present mapping method, it is possible to determine transmission timing of each RACH in one frame period in a fixed manner and therefore there is an advantage that receiving processing in the base station can be simplified.

Figure 16:
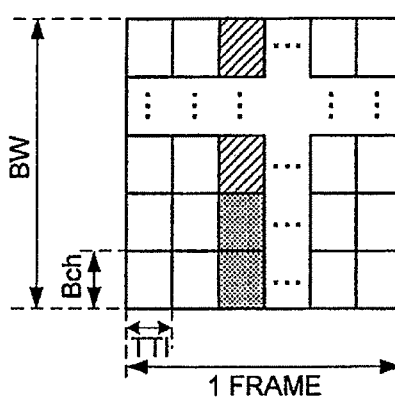
FIG. 16 A view showing other example of channel mapping a synchronous RACH/asynchronous RACH (an example where each of the asynchronous RACH and the synchronous RACH is provided in a common TTI with different frequency band).

In FIG. 16, the asynchronous RACH and the synchronous RACH are provided in different frequency bands in the same TTI (sub-frame period). The asynchronous RACH and the synchronous RACH are mapped in the same TTI regarding temporal axis. Moreover, regarding the frequency axis, the synchronous RACH and the asynchronous RACH are provided in a manner that they do not overlap with the frequency bandwidth of a resource unit (RU) (Bch) as a unit (i.e., frequency bands differ while both channels are multiplexed in a common TTI).

In the present mapping method, both the asynchronous/synchronous RACHs can be included in a common TTI and therefore, it becomes possible to reduce a communication resource compared to a case of allocating each channel to different TTIs. That is, there is an advantage that by the same resource used to allocate only the asynchronous RACH to TTI, allocation of both channels can be completed. Moreover, depending on the usage frequency of each RACH, ratio of division of the frequency band is changed to enable more efficient usage of the resource. Further, depending on the usage frequency of each RACH, band allocated to each RACH is adaptively changed to enable further improvement in resource usage efficiency. For example, if usage frequency of the synchronous RACH is high, ratio of the asynchronous RACH and the synchronous RACH may be set to, for example, 4:6, so that collision probability when the synchronous RACH is used is reduced and the resource is efficiently used.

Figure 17:
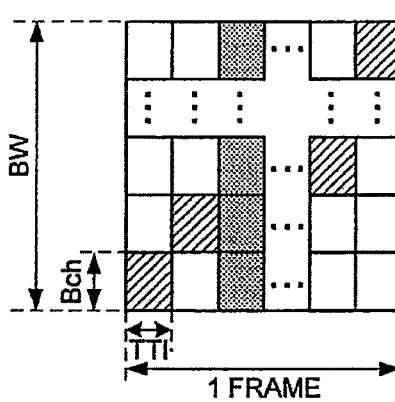
FIG. 17 A view showing other example of channel mapping a synchronous RACH/asynchronous RACH (an example where the asynchronous RACH is mapped in whole frequency band of one TTI and the synchronous RACH is provided in a manner to be dispersed on a frequency axis with a frequency band of a resource unit as a unit and is equally time-shared on a temporal axis).

In FIG. 17, the asynchronous RACH is provided in one TTI and the synchronous RACH is temporal shared by the unit of bandwidth (Bch) of a resource unit to be provided. That is, the asynchronous RACH is provided in all the frequency bands in one sub-frame period and the synchronous RACH is temporal shared to be provided in one frame period with periodicity over a plurality of sub-frame periods while frequency band is differed with the frequency band (Bch) of one resource unit as a unit so that the frequency bands in each sub-frame period do not overlap. Here, the synchronous RACH may be provided in continuous TTI or provided with an interval of a plurality of TTIs. However, the synchronous RACH must be provided equally in one frame.

According to the mapping in FIG. 17, the synchronous RACH is equally provided in temporal axis direction and therefore when a request of data transmission by the synchronous RACH is generated, it is possible to immediately map the synchronous RACH in a resource (sub-carrier) without a long waiting time. Therefore, there is an effect that processing delay until the synchronous RACH is transmitted can be suppressed.

Figure 18:
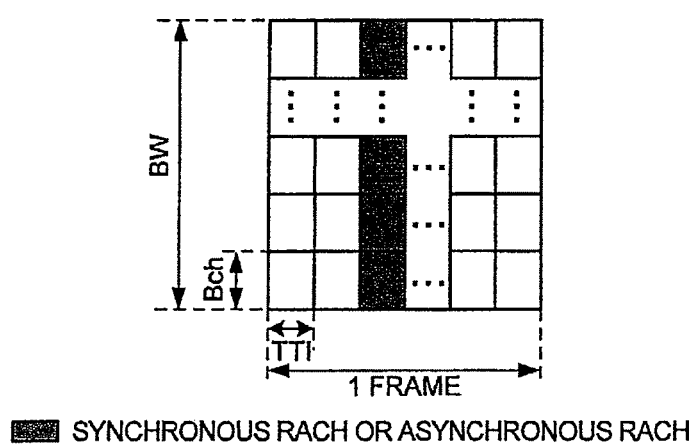
FIG. 18 A view showing other example of channel mapping a synchronous RACH/asynchronous RACH (an example where each of the asynchronous RACH and the synchronous RACH is provided sharing common TTI and frequency band).

In FIG. 18, the asynchronous RACH and the synchronous RACH are provided in the same TTI. The asynchronous RACH and the synchronous RACH share the same frequency band and TTI. That is, both of the channels are provided in the same frequency band in the same sub-frame period. The synchronous RACH and the asynchronous RACH are time shared in one sub-frame period depending on the necessity. Thus, it becomes difficult to occupy a redundant resource, For example, an uplink resource occupied for the synchronous RACH becomes unnecessary.

Here, the channel mapping method in FIGS. 15 to 18 may be defined previously in the mobile communication system or may be specified for each cell by annunciation information from the base station. Moreover, the channel mapping method shown in FIGS. 15 to 18 can be applied to the following embodiments in a similar manner.

Embodiment 4

Figure 14:
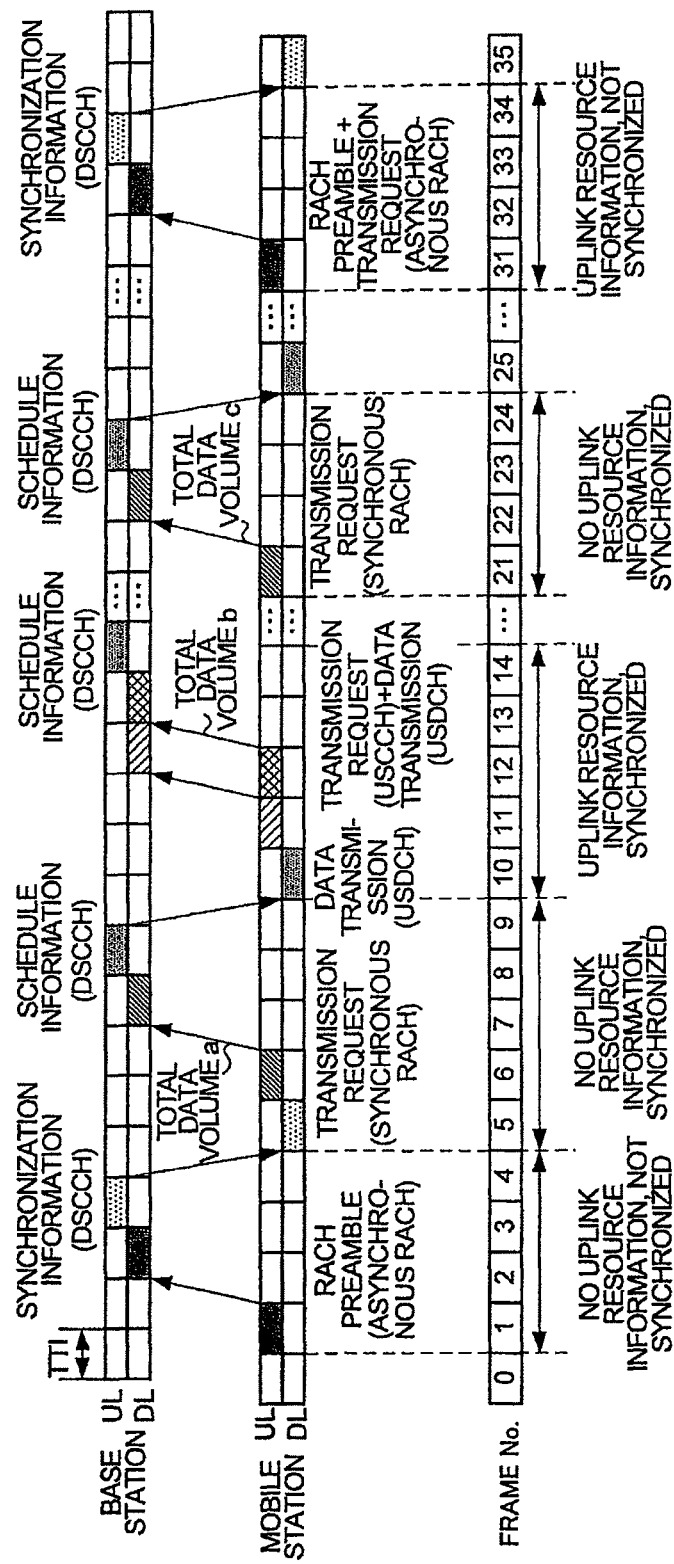
FIG. 14 A view showing other example of a series of procedures (and content) of uplink connection processing between a mobile station and a base station.

An embodiment 4 according to the present invention will be explained below. Configuration of a mobile station and a base station may be the same as those in the embodiment 1. FIG. 14 is another view showing an example of a series of procedures (and content) of an uplink connection processing between a mobile station and a base station. Communication procedures shown in FIG. 14 are preferable in a case where the following conditions (1) to (3) are satisfied.

(1) RACH preamble and a transmission request cannot be simultaneously included in one RACH transmission.
(2) USCCH includes a function to notify transmission data volume and is used for requesting allocation of a resource.
(3) A synchronous RACH has a function to notify transmission data volume and is used for a resource allocation request.

At this time, the mobile station uses an "asynchronous RACH" for a transmission request from "a condition where there is no uplink resource information and uplink is not synchronized". Moreover, the mobile station uses a "synchronous RACH" for a transmission request from "a condition where there is no uplink resource information and uplink is synchronized". Further, the mobile station uses a "USCCH" for a transmission request from "a condition where there is uplink resource information and uplink is synchronized".

Hereinafter, the transmission procedures in FIG. 14 will be explained in detail. In the initial transmission, that is, when "there is no uplink resource information and uplink is not synchronized," the USCCH cannot be used because an uplink resource is not allocated. Therefore, in the initial transmission, an asynchronous RACH is the most suitable (frame 1 in the figure).

The transmission request (resource allocation request) is transmitted after receiving transmission timing information alone. That is, when there is no uplink resource information and uplink is synchronized, uplink from the mobile station is corrected by the transmission timing information and therefore the synchronous RACH is the most suitable (frame 6 in the figure). The mobile station includes data volume to be transmitted in a synchronous RACH and transmits it only once (frame 6 in the figure).

Moreover, every time transmission data is generated, it is required to notify data volume to be transmitted in a similar manner. However, at this time, because an uplink resource is allocated, it is not necessary to use the synchronous RACH. That is, in a condition where there is uplink resource information and the uplink is synchronized, the USCCH is the most suitable for the transmission request (frame 12 in the figure).

The mobile station transmits data by use of the USDCH according to schedule information (frame 10 in the figure) notified by the DSCCH from the base station (frames 11 and 12). Subsequently, every time new transmission data is generated, data volume to be transmitted is included in the USCCH and transmitted only once. Here, the USCCH and the USDCH may be transmitted simultaneously.

Moreover, in case if new transmission data is generated after all the transmission data are transmitted and before uplink line is out of sync, that is, there is no uplink resource information and uplink is synchronous, the USCCH cannot be used because no uplink resource is allocated. Therefore, in this case, synchronous RACH is the most suitable (frame 21 in the figure).

In addition, in a condition where the base station allocates an uplink resource to the mobile station but transmission timing of the mobile station is not corrected yet because of the reason such as handover has been just carried out, that is, when there is uplink resource information and uplink is not synchronized, the USCCH and the synchronous RACH cannot be used until timing information is received from the base station. Therefore, in such a case, the asynchronous RACE is the most suitable (frame 31 in the figure).

Any of the methods shown in FIGS. 15 to 18 in the embodiment 3 can be used for the channel mapping of the asynchronous RACH and the synchronous RACH in the embodiment 4.

Embodiment 5

Figure 19:
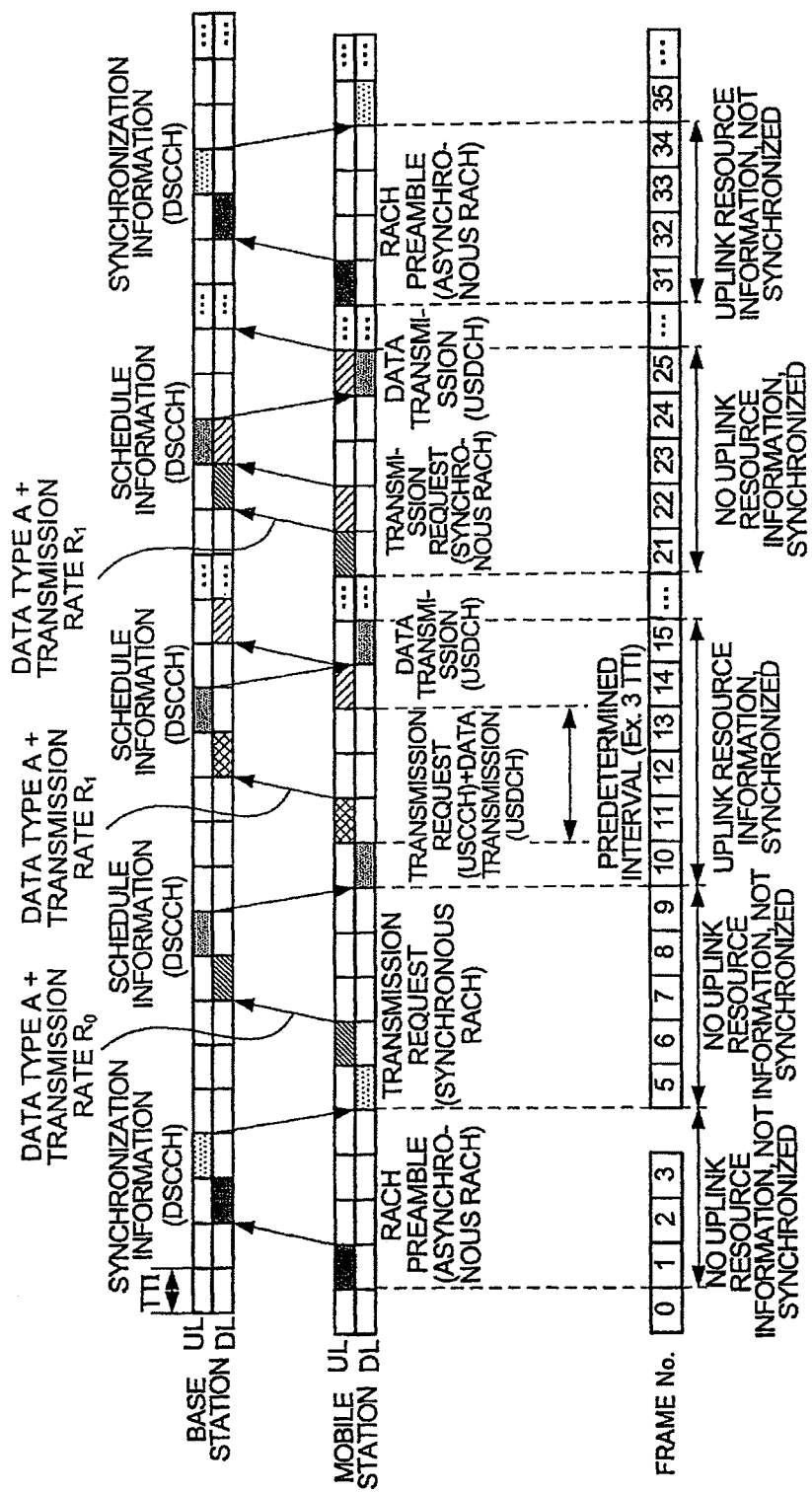
FIG. 19 A view showing other example of a series of procedures (and content) of uplink connection processing between a mobile station and a base station.

An embodiment 5 according to the present invention will be explained below. Configuration of a mobile station and a base station may be the same as those in the embodiment 1. FIG. 19 is another view showing an example of a series of procedures (and content) of an uplink connection processing between a mobile station and a base station.

Communication procedures shown in FIG. 19 are most suitable in a case where transmission data including a predetermined transmission interval and a fixed transmission rate (e.g., verbal communication) is transmitted and is especially preferable in a case where the following conditions (1) to (3) are satisfied.

(1) RACH preamble and a transmission request cannot be simultaneously included in one RACH transmission.
(2) USCCH includes a function to notify data type and transmission rate and is used for requesting allocation of a resource.
(3) A synchronous RACH has a function to notify data type and transmission rate and is used for a resource allocation request.

At this time, the mobile station uses an "asynchronous RACH" for a transmission request from "a condition where there is no uplink resource information and uplink is not synchronized". Moreover, the mobile station uses the "USCCH" for a transmission request from "a condition where there is uplink resource information and uplink is synchronized". Further, a "synchronous RACH" is used for a transmission request from "a condition where there is no uplink resource information and uplink is synchronized".

Hereinafter, the transmission procedures in FIG. 19 will be explained in detail. In the initial transmission, that is, when "there is no uplink resource information and uplink is not synchronized," the USCCH cannot be used because an uplink resource is not allocated. Therefore, in the initial transmission, an asynchronous RACH is the most suitable (frame 1 in the figure).

The transmission request is transmitted after receiving transmission timing information alone. That is, when there is no uplink resource information and uplink is synchronized, uplink from the mobile station is corrected by the transmission timing information and therefore the synchronous RACH is the most suitable for the transmission request (frame 6 in the figure). The mobile station includes data type and transmission rate of data to be transmitted in a synchronous RACH and transmits it only once (frame 6 in the figure).

Here, in a case where data type includes a predetermined transmission interval and a fixed transmission rate, the base station carries out scheduling to allocate an uplink resource by a predetermined interval and notifies schedule information to the mobile station by use of the DSCCH (frame 10 in the figure). The mobile station carries out transmission using the uplink resource thus allocated with the predetermined interval according to the scheduling information (frames 11 and 14 in the figure). Here, there may be a case where the base station allocates an uplink resource to the mobile station for transmission of a transmission request by the USCCH and a case where the base station does not allocate an uplink resource to the mobile station for transmission of a transmission request by the USCCH. Allocation of an uplink resource enables quick response to changes such as increased traffic. However, if transmission rate does not change, allocation of a resource is a waste and the opposite is also true. Here, both cases will be described.

If there is allocation of a resource for a transmission request, that is, if there is uplink resource information and uplink is synchronized, the USCCH is the most suitable for the transmission request (frame 11 in the figure). Here, the USCCH and the USDCH may be simultaneously transmitted at this time. On the other hand, if there is no resource allocation for the transmission request, that is, there is not uplink resource information and the uplink is synchronized, the USCCH cannot be used because an uplink resource is not allocated. Therefore, the synchronous RACH is the most suitable for the transmission request (frame 21 in the figure).

Moreover, in a condition where the base station allocates an uplink resource to the mobile station but transmission timing of the mobile station is not corrected yet because of a reason such as handover has been just carried out, that is, when there is uplink resource information and uplink is not synchronized, the USCCH and the synchronous RACH cannot be used until timing information is received from the base station. Therefore, in such a case, the asynchronous RACH is the most suitable (frame 31 in the figure).

Any of the methods shown in FIGS. 15 to 18 in the embodiment 3 can be used for the channel mapping of the asynchronous RACH and the synchronous RACH in the embodiment 5.

Embodiment 6

Figure 20:
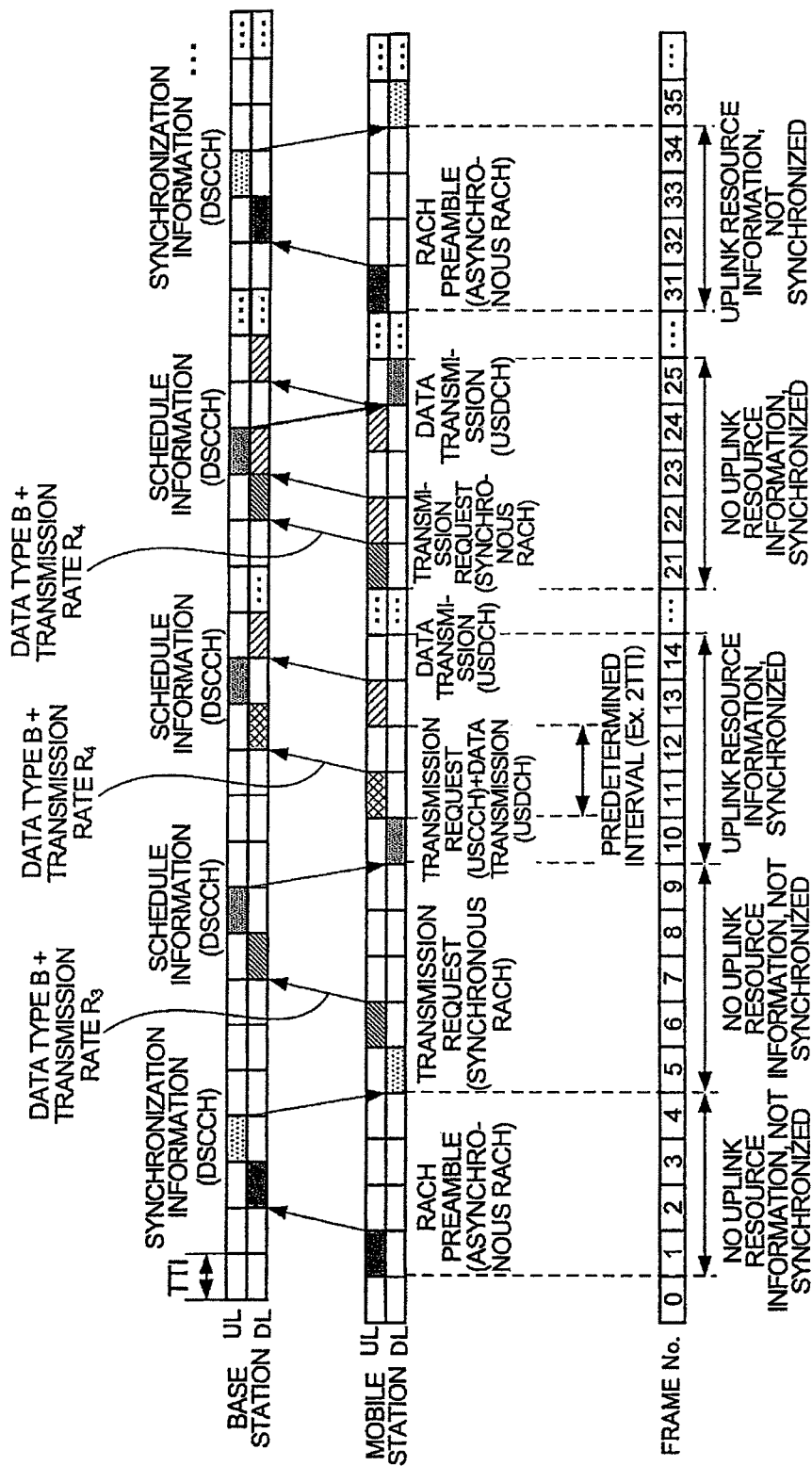
FIG. 20 A view showing other example of a series of procedures (and content) of uplink connection processing between a mobile station and a base station.

An embodiment 6 according to the present invention will be explained below. Configuration of a mobile station and a base station may be the same as those in the embodiment 1. FIG. 20 is another view showing an example of a series of procedures (and content) of an uplink connection processing between a mobile station and a base station. Assumed conditions in the communication procedures of FIG. 20 are the same as those in the embodiment 5. However, the procedures in FIG. 20 are especially suitable for a case where transmission data including a predetermined transmission interval and variable transmission rate (e.g., video communication of variable bit rate).

That is, according to the procedures of FIG. 20, the mobile station uses the "asynchronous RACH" for a transmission request from "a condition where there is no uplink resource information and uplink is not synchronized". Moreover, the mobile station uses the "USCCH" for a transmission request from "a condition where there is uplink resource information and uplink is synchronized". Further, the "synchronous RACH" is used for a transmission request from "a condition where there is no uplink resource information and uplink is synchronized".

Hereinafter, the transmission procedures in FIG. 20 will be explained in detail. In the initial transmission, that is, when "there is no uplink resource information and uplink is not synchronized," the USCCH cannot be used because an uplink resource is not allocated. Therefore, in the initial transmission, an asynchronous RACH is the most suitable (frame 1 in the figure).

The transmission request is transmitted after receiving transmission timing information alone. That is, when there is no uplink resource information and uplink is synchronized, uplink from the mobile station is corrected by the transmission timing information and therefore the synchronous RACH is the most suitable for the transmission request (frame 6 in the figure).

The mobile station includes data type and transmission rate of data to be transmitted in the synchronous RACH and transmits it only once (frame 6 in the figure). Here, in a case where data type includes a predetermined transmission interval and a variable transmission rate, the base station carries out scheduling to allocate an uplink resource by a predetermined interval and notifies schedule information to the mobile station using the DSCCH (frame 10 in the figure). The mobile station carries out transmission using the uplink resource thus allocated with the predetermined interval according to the scheduling information (frames 11 and 13 in the figure).

Here, there may be a case where the base station allocates an uplink resource to the mobile station for transmission of a transmission request by the USCCH and a case where the base station does not allocate an uplink resource to the mobile station for transmission of a transmission request by the USCCH. Allocation of an uplink resource enables quick response to changes such as increased traffic. However, if transmission rate does not change, allocation of a resource is a waste and the opposite is also true. Here, both cases will be described.

If there is allocation of a resource for a transmission request, that is, if there is uplink resource information and uplink is synchronized, the USCCH is the most suitable for the transmission request (frame 11 in the figure). Here, the USCCH and the USDCH may be simultaneously transmitted at this time. On the other hand, if there is no resource allocation for the transmission request, that is, there is not uplink resource information and the uplink is synchronized, the USCCH cannot be used because an uplink resource is not allocated. Therefore, the synchronous RACH is the most suitable for the transmission request (frame 21 in the figure).

Moreover, in a condition where the base station allocates an uplink resource to the mobile station but transmission timing of the mobile station is not corrected yet because of a reason such as handover has been just carried out, that is, when there is uplink resource information and uplink is not synchronized, the USCCH and the synchronous RACH cannot be used until timing information is received from the base station. Therefore, in such a case, the asynchronous RACH is the most suitable (frame 31 in the figure).

Any of the methods shown in FIGS. 15 to 18 in the embodiment 3 can be used for the channel mapping of the asynchronous RACH and the synchronous RACH in the embodiment 6.

Embodiment 7

Figure 21:
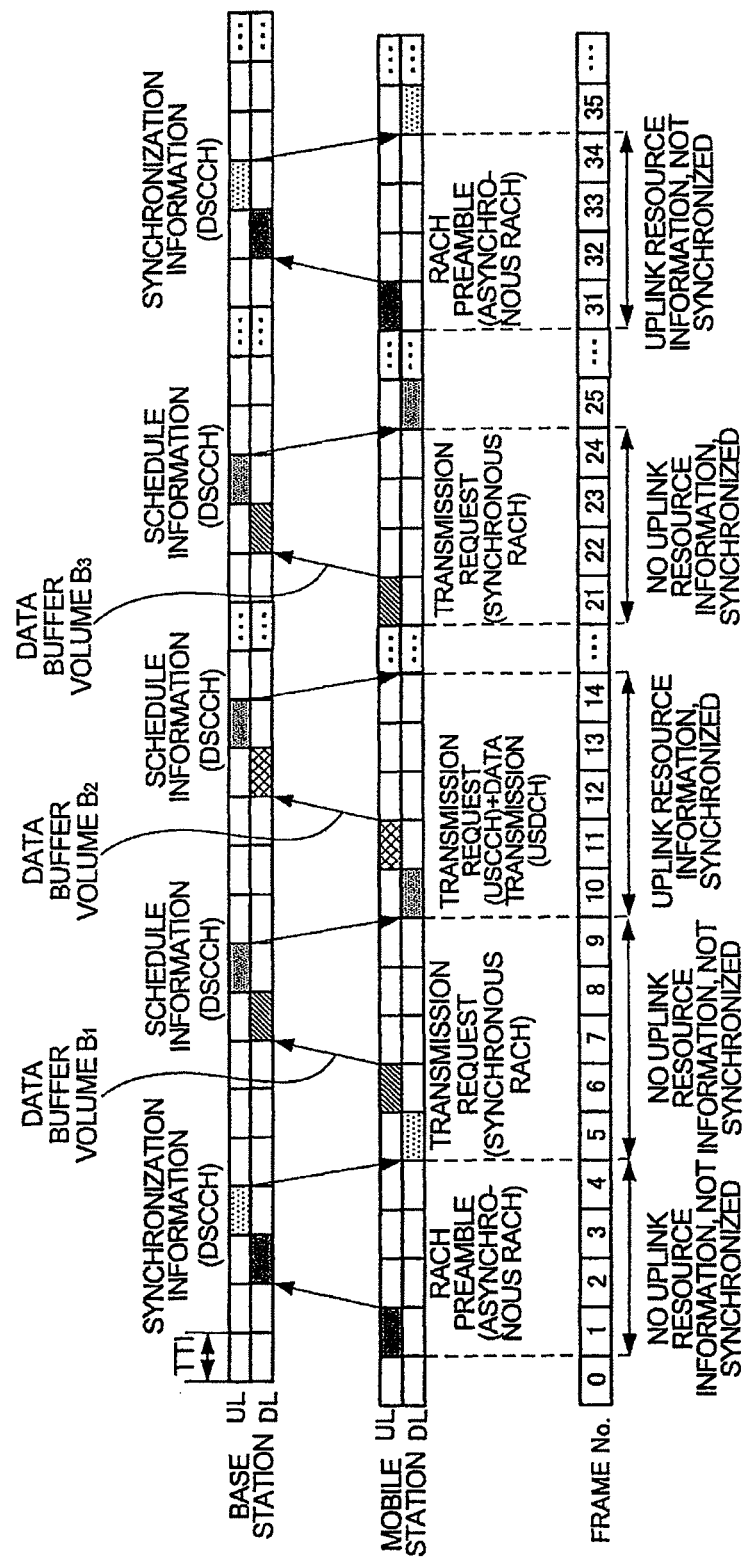
FIG. 21 A view showing other example of a series of procedures (and content) of uplink connection processing between a mobile station and a base station.
Figure 22:
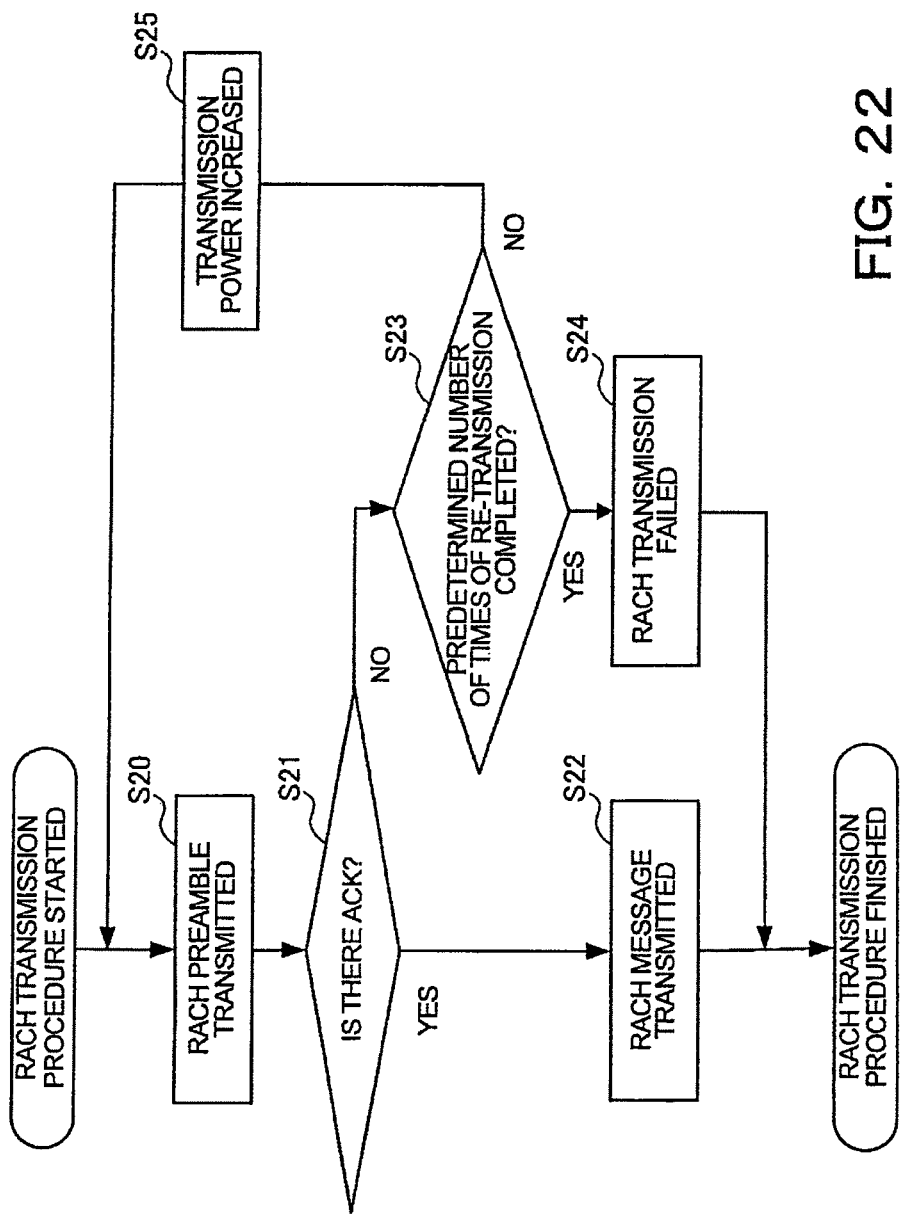
FIG. 22 A flowchart showing a procedure of random access (RACH transmission procedure) in an uplink line in W-CDMA method.

An embodiment 7 according to the present invention will be explained below. Configuration of a mobile station and a base station may be the same as those in the embodiment 1. FIG. 21 is another view showing an example of a series of procedures (and content) of an uplink connection processing between a mobile station and a base station. Communication procedures shown in FIG. 21 are preferable in a case where the following conditions (1) to (3) are satisfied.

(1) RACH preamble and a transmission request cannot be simultaneously included in one RACH transmission.
(2) USCCH includes a function to notify untransmitted data buffer volume of the mobile station and is used for requesting allocation of a resource.
(3) A synchronous RACH has a function to notify untransmitted data buffer volume of the mobile station and is used for a resource allocation request.

At this time, the mobile station uses the asynchronous RACH for a transmission request from a condition where there is no uplink resource information and uplink is not synchronized. Moreover, the mobile station uses the "USCCH" for a transmission request from a condition where there is uplink resource information and uplink is synchronized. Further, the synchronous RACH is used for a transmission request from a condition where there is no uplink resource information and uplink is synchronized.

Hereinafter, the transmission procedures in FIG. 21 will be explained in detail. In the initial transmission, that is, when "there is no uplink resource information and uplink is not synchronized," the USCCH cannot be used because an uplink resource is not allocated. Therefore, in the initial transmission, an asynchronous RACH is the most suitable (frame 1 in the figure).

The transmission request is transmitted after receiving transmission timing information alone. That is, when there is no uplink resource information and uplink is synchronized, uplink from the mobile station is corrected by the transmission timing information and therefore the synchronous RACH is the most suitable for the transmission request (frame 6 in the figure). The mobile station includes currently-accumulated data buffer volume in a synchronous RACH and transmits it as the first transmission request only once (frame 6 in the figure).

In FIG. 21, it is shown that scheduling is carried out in the base station on the basis of data buffer volume B1 notified by the frame 6, schedule information is notified to the mobile station by the DSCCH (frame 10 in the figure), and data is transmitted by the USDCH according to the schedule information (frame 11 in the figure).

The mobile station needs to notify data buffer volume as transmission request every time after the first transmission request to the base station until the data buffer volume becomes zero. However, because allocation of an uplink resource is carried out at this time, it is not necessary to use the synchronous RACH. Therefore, in a case where there is uplink resource information and uplink is synchronized, the USCCH is the most suitable for the transmission request other than the first transmission request (frame 11 in the figure). Here, the USCCH and the USDCH may be simultaneously transmitted at this time.

Moreover, in case if new transmission data is generated after the data buffer volume becomes zero and before uplink line is out of sync, that is, there is no uplink resource information and uplink line is synchronous, because no uplink resource is allocated, the USCCH cannot be used. Therefore, the asynchronous RACH is most suitable at this time (frame 21 in the figure).

Moreover, in a condition where the base station allocates an uplink resource to the mobile station but transmission timing of the mobile station is not corrected yet because of a reason such as handover has been just carried out, that is, when there is uplink resource information and uplink is not synchronized, the USCCH and the synchronous RACH cannot be used until timing information is received from the base station. Therefore, in such a case, the asynchronous RACH is the most suitable (frame 31 in the figure).

Any of the methods shown in FIGS. 15 to 18 in the embodiment 3 can be used for the channel mapping of the asynchronous RACH and the synchronous RACH in the embodiment 7.

As described above, the embodiments of the present invention were explained with reference to figures. However, the present invention is not limited thereto and it is to be understood that various changes and modifications can be made without departing from the scope and spirit of the present invention.

For example, the control channel used when the mobile station transmits a new resource allocation request to the base station in a condition where a resource is allocated is not always limited to the uplink shared control channel (USCCH). Other control channel may be used as long as the channel can be commonly used by mobile stations and the channel can transmit information such as data type. Moreover, depending on the condition, a plurality of channels may be selectively or simultaneously used.

In addition, there may be a case where adaptively using the channel mapping method of the synchronous RACH/asynchronous RACH shown in FIGS. 15 to 18 depending on the condition of the mobile station improves usage efficiency of a resource. Further, it is also conceivable that interval of provision of the TTI used for allocation of the synchronous RACH or the asynchronous RACH is changed depending on whether there are many sub-carriers or small number of sub-carriers.

As explained above, according to the present invention, it is possible to realize a new connection processing between a mobile station and a base station which can flexibly correspond to actual condition of the mobile station or variations of actual transmission procedures, can efficiently use a communication resource, and complies the EUTRA standard.

That is, it becomes possible to clarify which communication channel is to be used in which case in an uplink line connection processing between a mobile station and a base station in EUTRA, taking efficient usage of a resource or communication quality into consideration holistically. Therefore, the most appropriate connection processing in the multi-carrier communication system of the EUTRA standard can be realized.

Moreover, even if two types of information are transmitted (specifically, if the mobile station transmits an uplink synchronization request and a resource allocation request simultaneously), the most suitable usage channel is determined taking this case into consideration and therefore flexible correspondence can be realized.

Further, effective usage of the synchronous RACH without guard time enables to improve usage efficiency of a resource of OFDM communication and also enables to suppress waste of a resource usable for data communication or the like which is simultaneously carried out.

Further, when mapping (allocating) the synchronous RACH/asynchronous RACH to a communication resource of OFDM regulated by a temporal axis and a frequency axis, various mapping methods (i.e., sub-frame division method, frequency band division method within a common sub-frame, a method for equally dispersing synchronous RACHs on a temporal axis while differing frequency band within one frame, a method for allocating both RACHs to a common sub-frame) are selectively used and mapping with wide variations is appropriately used to enable further efficient usage of a resource.

According to the present invention, content of an uplink connection processing including RACH sequence in EUTRA can be specifically and objectively regulated and especially, the most suitable uplink channel usage method of the EUTRA can be provided.

As explained above, the present invention has an effect of achieving a new connection processing between a mobile station and a base station which can flexibly correspond to actual condition of the mobile station or to variation of an actual transmission procedure, can efficiently utilize a communication resource, and follows the EUTRA standard. Therefore, the present invention is appropriate as a connection processing method between a mobile station and a base station, a mobile station (including a cellular phone, a PDA terminal, and a mobile personal computer), a base station, a multi-carrier mobile communication system, and a mapping method of a random access channel.

We claim:

1. A processing method of a mobile station, comprising:
    performing communication with a base station using at least a random access channel having guard time;
    obtaining, from the base station, correction information for correcting a transmission timing shift present in an uplink line of the mobile station;
    correcting the transmission timing shift according to the correction information, and
    within a period in which the correction information is valid and has been used to correct the transmission timing shift, requesting, from the base station via the random access channel having the guard time, communication resource allocation information, wherein the random access channel having guard time is also available in at least non-synchronous condition in uplink in order to establish synchronous condition with the base station in uplink.

2. The processing method according to claim 1, wherein
the mobile station obtains the communication resource allocation information of the transmission data transmitted from the base station to the mobile station according to the request, and
the mobile station transmits the data to the base station according to the obtained communication resource allocation information of the transmission data.

3. A mobile station, wherein
the mobile station carries out the processing method according to claim 1 or claim 2.

4. A mobile station, wherein
a plurality of communication function sections and a control section supervising the plurality of communication function sections carry out the processing method according to claim 1 or claim 2.

5. A processing method of a base station, comprising:
at least a random access channel having guard time when a mobile station performs communication with the base station, wherein
receiving, from a mobile station, a request for timing correction information communication resource allocation;
transmitting, to the mobile station, the requested timing correction information for correction, by the mobile station, of a transmission timing shift in an uplink line of the mobile station; and
upon receiving a random access that used the random access channel having the guard time transmitted from the mobile station within a period in which the correction information is valid and was used to correct the transmission timing shift, transmitting, to the mobile station, communication resource allocation information of transmission data,
wherein the random access channel having guard time is also available in at least non-synchronous condition in uplink in order to establish synchronous condition with the base station in uplink.

6. A base station, wherein
the base station carries out the processing method according to claim 5.

7. A base station, wherein
a plurality of communication function circuit sections carries out the processing method according to claim 5.

8. A communication system, comprising:
a base station; and
a mobile station configured to utilize at least a random access channel having guard time when communicating with the base station, wherein
the mobile station:
obtains from the base station correction information for correcting a transmission timing shift in an uplink line of the mobile station;
corrects the transmission timing shift according to the correction information, and
within a period in which the correction information is valid and has been used to correct the transmission timing shift, requests, from the base station and via the random access channel having the guard time, communication resource allocation information of transmission data, and wherein
the base station:
transmits the communication resource allocation information of the transmission data to the mobile station, when having detected a random access that used the random access channel having the guard time and was performed by the mobile station within a period in which the correction information is valid,
wherein the random access channel having guard time is also available in at least non-synchronous condition in uplink in order to establish synchronous condition with the base station in uplink.

9. The communication system according to claim 8, wherein
the mobile station obtains the communication resource allocation information for transmission data transmitted from the base station to the mobile station, and
the mobile station transmits the data to the base station according to the obtained communication resource allocation information obtained for the transmission data.

10. The processing method of a mobile station according to claim 1, wherein
the mobile station also includes a control channel in the uplink line from the mobile station to the base station when the mobile station performs communication with the base station;
when a communication resource for transmitting the control channel is assigned to the mobile station within the period, the request for the communication resource allocation information is made using the control channel; and
when a communication resource from transmitting the control channel in the uplink line is not assigned to the mobile station within the period, the request for the communication resource allocation information is made using the random access channel having guard time.

* * * * *